United States Patent
Anantha Narayana Iyer et al.

(10) Patent No.: US 12,545,777 B2
(45) Date of Patent: Feb. 10, 2026

(54) THERMOPLASTIC VULCANIZATE COMPOSITIONS

(71) Applicant: Celanese International Corporation, Irving, TX (US)

(72) Inventors: Krishnan Anantha Narayana Iyer, Manvel, TX (US); Antonios K. Doufas, Houston, TX (US); Michael J. Goncy, Mont Belvieu, TX (US); Eric P. Jourdain, Rhode Saint Genese (BE)

(73) Assignee: Celanese International Corporation, Irving, TX (US)

( * ) Notice: Subject to any disclaimer, the term of this patent is extended or adjusted under 35 U.S.C. 154(b) by 1086 days.

(21) Appl. No.: 17/601,616

(22) PCT Filed: Jun. 19, 2020

(86) PCT No.: PCT/US2020/038702
§ 371 (c)(1),
(2) Date: Oct. 5, 2021

(87) PCT Pub. No.: WO2020/257630
PCT Pub. Date: Dec. 24, 2020

(65) Prior Publication Data
US 2022/0177685 A1    Jun. 9, 2022

Related U.S. Application Data

(60) Provisional application No. 62/864,978, filed on Jun. 21, 2019.

(51) Int. Cl.
*C08L 23/16* (2006.01)
(52) U.S. Cl.
CPC .......... *C08L 23/16* (2013.01); *C08L 2312/04* (2013.01)
(58) Field of Classification Search
CPC ............................. C08L 23/16; C08L 2312/04
USPC ....................................................... 524/432
See application file for complete search history.

(56) References Cited

U.S. PATENT DOCUMENTS

| | | | |
|---|---|---|---|
| 2,972,600 A | 2/1961 | Braidwood | |
| 3,287,440 A | 11/1966 | Arnold | |
| 4,311,628 A | 1/1982 | Abdou-Sabet et al. | |
| 4,540,753 A | 9/1985 | Cozewith et al. | |
| 4,594,390 A | 6/1986 | Abdou-Sabet et al. | |
| 4,594,391 A | 6/1986 | Jones | |
| 4,803,244 A | 2/1989 | Umpleby | |
| 4,916,198 A | 4/1990 | Scheve et al. | |
| 5,047,446 A | 9/1991 | DeNicola, Jr. | |
| 5,047,485 A | 9/1991 | DeNicola, Jr. | |
| 5,100,947 A | 3/1992 | Puydak et al. | |
| 5,157,081 A | 10/1992 | Puydak et al. | |
| 5,414,027 A | 5/1995 | DeNicola, Jr. et al. | |
| 5,570,595 A | 11/1996 | Alberto | |
| 5,656,693 A | 8/1997 | Ellul et al. | |
| 5,672,660 A | 9/1997 | Medsker et al. | |
| 5,756,416 A | 5/1998 | Wasserman et al. | |
| 5,783,645 A | 7/1998 | Baker et al. | |
| 5,936,028 A | 8/1999 | Medsker et al. | |
| 5,952,425 A | 9/1999 | Medsker et al. | |
| 6,268,438 B1 | 7/2001 | Ellul et al. | |
| 6,288,171 B2 | 9/2001 | Finerman et al. | |
| 6,407,174 B1 | 6/2002 | Ouhadi | |
| 6,433,090 B1 | 8/2002 | Ellul et al. | |
| 6,437,030 B1 | 8/2002 | Coran et al. | |
| 6,451,915 B1 | 9/2002 | Ellul et al. | |
| 6,503,984 B2 | 1/2003 | Johnson et al. | |
| 6,503,985 B1 | 1/2003 | Ellul et al. | |
| 6,656,693 B2 | 12/2003 | Saraf et al. | |
| 6,939,918 B2 | 9/2005 | Ellul et al. | |
| 7,390,850 B2 | 6/2008 | Cook et al. | |
| 7,504,458 B2 | 3/2009 | Abraham et al. | |
| 7,655,727 B2 | 2/2010 | Ellul et al. | |

(Continued)

FOREIGN PATENT DOCUMENTS

| EP | 0190889 | 4/1993 |
|---|---|---|
| EP | 0384431 | 11/1994 |

(Continued)

OTHER PUBLICATIONS

Abraham et al., "Oil Distribution in iPP/EPDM Thermoplastic Vulcanizates", Rubber Chemistry and Technology, 2007, vol. 80, No. 2, pp. 324-339.
Litvinov, V.M., "EPDM/PP Thermoplastic Vulcanizates as Studied by Proton NMR Relaxation: Phase Composition, Molecular Mobility, Network Structure in the Rubbery Phase, and Network Heterogeneity", Macromolecules 2006, vol. 39, No. 25, pp. 8727-8741.
Ravishankar et al., "Recent advances in EPDM and dynamically vulcanized thermoplastic elastomers", Rubber World, vol. 252, pp. 1-4 (2015).
Anne K. Rhodes "New Lubes Plants Use State-of-the Art Hydrodewaxing Technology" in Oil & Gas Journal, Sep. 1, 1997.

(Continued)

*Primary Examiner* — Marc S Zimmer
*Assistant Examiner* — Ronald Grinsted
(74) *Attorney, Agent, or Firm* — Dority & Manning, P.A.

(57) ABSTRACT

In another embodiment, a TPV composition includes an ethylene based copolymer, a thermoplastic polyolefin, and one or more of an oil or a plasticizer. The ethylene based copolymer has an Mw of from 400,000 g/mol to 3,000,000 g/mol, a Mw/Mn of 10 or less, and a $g'_{vis}$ of 0.7 or more. An amount of the one or more of an oil or a plasticizer in the TPV composition is from 10 parts by weight to 200 parts by weight per 100 parts by weight of the ethylene based copolymer, and the TPV composition has an extrusion surface roughness that is from 50 μin to 120 μin. In another embodiment is provided a method of forming a TPV composition. In another embodiment is provided a method of forming an article that includes a TPV composition. In another embodiment is provided an article that includes a TPV composition.

26 Claims, No Drawings

(56) References Cited

U.S. PATENT DOCUMENTS

| | | |
|---|---|---|
| 7,851,556 B2 | 12/2010 | Abraham et al. |
| 7,868,096 B2 | 1/2011 | Ellul et al. |
| 7,951,871 B2 | 5/2011 | Blok et al. |
| 8,178,625 B2 | 5/2012 | Ellul et al. |
| 8,338,543 B2 | 12/2012 | Moscardi et al. |
| 10,279,527 B2 | 5/2019 | Kerstetter, III et al. |
| 2004/0242779 A1 | 12/2004 | Cai et al. |
| 2007/0021564 A1 | 1/2007 | Ellul et al. |
| 2008/0076879 A1 | 3/2008 | Resendes et al. |
| 2009/0270545 A1 | 10/2009 | Sahnoune et al. |
| 2011/0028637 A1 | 2/2011 | Ellul et al. |
| 2016/0340480 A1* | 11/2016 | Kerstetter, III ....... B29C 48/022 |
| 2016/0347946 A1 | 12/2016 | Shannon et al. |
| 2018/0030219 A1 | 2/2018 | Chung et al. |

FOREIGN PATENT DOCUMENTS

| | | |
|---|---|---|
| EP | 0351866 | 1/1997 |
| EP | 0634441 | 5/1998 |
| EP | 0889090 | 1/1999 |
| EP | 0892831 | 5/2000 |
| JP | 2017531727 A | 10/2017 |
| JP | 2018511682 A | 4/2018 |
| WO | WO 2005/028555 | 3/2005 |
| WO | 2016/190981 | 12/2016 |
| WO | 2018/125391 | 7/2018 |

OTHER PUBLICATIONS

Gedeon et al. "Use of "Clean" Paraffinic Processing Oils to Improve TPE Properties"., Presented at TPEs 2000 Philadelphia, P.A., Sep. 27-28, 1999.

Hyun et al. A review of nonlinear oscillatory shear tests: Analysis and application of large amplitude oscillatory shear (LAOS), Progress in Polymer Science, vol. 36, Issue 12, pp. 1697-1753, 2001.

Krishna et al. "Next Generation Isodewaxing and Hydrofinishing Technology for Production of High Quality Bae Oils" 2002 NPRA Lubricants and Waxws Meeting, Nov. 14-15, 2002.

Office Action for Chinese Application for Invention No. 202080035509.3 (English Translation) Jul. 25, 2023, 14 pages.

\* cited by examiner

THERMOPLASTIC VULCANIZATE COMPOSITIONS

CROSS REFERENCE TO RELATED APPLICATIONS

This application is a U.S. national phase application of PCT Application No. PCT/US2020/038702 having a filing date of Jun. 19, 2020, which claims priority to and the benefit of U.S. Provisional Application Ser. No. 62/864,978, filed Jun. 21, 2019, the disclosures of each are hereby incorporated by reference in their entirety.

FIELD

The present disclosure relates to thermoplastic vulcanizate (TPV) compositions having improved elastic and flow properties.

BACKGROUND

Automotive equipment manufacturers and suppliers are increasingly utilizing TPV compositions for automotive weather seals instead of EPDM or other thermoset compounds. Some reasons for the increased utilization of TPV compositions include advantages in processability and recyclability. Lips are a portion of the weather seal structure with highly demanding requirements for elasticity and resiliency. For example, the lip should immediately retract back to its original position upon deflection when touching the glass at temperatures up to about 90° C.

In comparison to EPDM, TPV compositions typically show inferior elastic properties due to the existence of the thermoplastic phase. In addition to elasticity, TPV compositions should have a good balance of other mechanical properties such as hardness and tensile. Furthermore, extrusion applications like glass run channels demand excellent surface finish for TPV compositions free of defects such as edge tear, surface spots, and optical defects such as rococo. The inferior elastic properties are, in part, is associated with the high yield stress of TPV compositions in the melt state, resulting in a poor flow/melt stagnation. Approaches to alleviate the problem, e.g., including diluting the EPDM content and/or changing the cure state of the EPDM particles, can adversely affect elastic properties. Other flow enhancing additives, such as plastomers, can negatively impact elastic properties. In addition, improving processability while minimizing the negative impact on elastic properties remains a challenge for certain EPDMs.

There is a need to develop TPV compositions with superior balance of elastic properties in combination with mechanical properties as well as superior flow and extruder processability.

SUMMARY

In an embodiment, a thermoplastic vulcanizate (TPV) composition includes an ethylene based copolymer, a thermoplastic polyolefin, and one or more of an oil or a plasticizer, the ethylene based copolymer having an Mw of from 400,000 g/mol to 3,000,000 g/mol, a Mw/Mn of 10 or less, and a $g'_{vis}$ of 0.7 or more. The amount of the one or more of an oil or a plasticizer contained in the ethylene based copolymer is from 10 parts by weight to 200 parts by weight per 100 parts by weight of the ethylene based copolymer, and the one or more of an oil or a plasticizer is added during a fabrication of the TPV composition before and after the addition of a curative, such that 3 wt % to 37 wt % of a total amount of the one or more of an oil or a plasticizer is added before the curative and 63 wt % to 97 wt % of the one or more of an oil or a plasticizer is added after the curative.

In another embodiment, a TPV composition includes an ethylene based copolymer, a thermoplastic polyolefin, and one or more of an oil or a plasticizer. The ethylene based copolymer has an Mw of from 400,000 g/mol to 3,000,000 g/mol, a Mw/Mn of 10 or less, and a $g'_{vis}$ of 0.7 or more. An amount of the one or more of an oil or a plasticizer in the TPV composition is from 10 parts by weight to 200 parts by weight per 100 parts by weight of the ethylene based copolymer, and the TPV composition has an extrusion surface roughness that is from 50 μin to 120 μin.

In another embodiment, a method of making the TPV composition includes introducing an ethylene based copolymer to an extrusion reactor, introducing a thermoplastic polyolefin to the extrusion reactor, introducing a filler, an additive, or a combination of filler and additive to the extrusion reactor, introducing a first amount of oil to the extrusion reactor before a curative, introducing the curative to the extrusion reactor, introducing a second amount of oil to the extrusion reactor after the curative, wherein 3 wt % to 37 wt % of a total amount of the one or more of an oil or a plasticizer is added to the extrusion reactor before the curative and 63 wt % to 97 wt % of the total amount of the one or more of an oil or a plasticizer is added to the extrusion reactor after the curative, and dynamically vulcanizing the ethylene based copolymer with the curative in the presence of the thermoplastic polyolefin to form the TPV composition.

In another embodiment, a method of forming an article includes extruding, injection molding, blow molding, compression molding, thermoforming, or 3-D printing a TPV composition; and forming the article.

In another embodiment is provided an article that includes a TPV composition. In some embodiments, the article is an extruded tape, a weather seal, a door panel, a gasket, a pipe seal, a hose, a belt, or a boot.

DETAILED DESCRIPTION

The present disclosure relates to TPV compositions that include an ethylene based copolymer (e.g., an ethylene-propylene-diene terpolymer) and a polyolefin (such as a polypropylene). Herein, this disclosure provides improved TPV compositions with excellent elastic recovery and fabricability/processability and that can be suitable for shaped articles and shaped components as part of composite structures. The TPV compositions disclosed herein can have an excellent balance of flow and elastic properties relative to conventional TPV compositions.

The inventors have surprisingly discovered that a TPV composition with superior elastic properties and improved flow can be obtained by tuning the ratio of a post-cure oil to a pre-cure oil added. In addition, the inventors have found that incorporation of excess oil to reduce viscosity negatively impacts elasticity and surface extrusion properties. However, it was surprisingly found that if the excess oil is added after the introduction of the curative (post-cure), the TPV melt viscosity can be significantly reduced while enhancing elasticity. Increasing the post-cure oil content was found to improve elastic recovery after compression and tension set at short recovery times under elevated temperature conditions. This approach can be adopted with TPV formulations that include polyolefins, curable rubber (e.g., EPDM rubber 5-ethylidene-2-norbornene and/or 5-vinyl-2-norbornene (VNB)), filler (e.g., clay), oil (e.g., a paraffinic processing oil, a Group II oil, a Group I oil, a synthetic oil), and a curing system (e.g. phenolic cure, hydrosilylation, peroxide, silane grafting/moisture cure etc., and preferably phenolic cure).

The disclosure also shows a method of making TPV compositions. In at least one embodiment, an oil (e.g., a process oil) is introduced at different feed locations, where the amount of oil introduced at the first oil injection location before introduction of the curative to the extrusion reactor is less than the amount of oil introduced at the second oil injection location after the curative introduction to the extruder reactor. The curative can be added to the extruder after the first oil injection. It has been discovered that a TPV composition with greater than 20 wt % total oil based on a total weight of a TPV composition incorporated after curative addition shows significantly improved elastic properties while helping to reduce viscosity of the system. Other advantageous properties, such as improved surface performance and reduced specific gravity, can be achieved by adjusting the ratio of pre and post cure oil additions. For example, and in some embodiments, excellent surface extrusion properties may be achieved when less than 10% of the oil is added in the first injection. By tailoring the ratio of first oil addition to second oil addition ratio as well as the total oil, TPV compositions with exceptional elasticity and superior extrudability can be produced. This approach can be useful in producing TPVs with good elasticity using non-oil extended bimodal EPDM like Vistalon 9600.

For purposes of this disclosure, and unless otherwise indicated, a "composition" includes components of the composition and/or reaction products of two or more components of the composition.

For purposes of this disclosure and unless otherwise indicated, "pre-cure" refers to before the addition of a curative to the extrusion reactor. For example, pre-cure oil refers to the oil added to the extrusion reactor before the addition of a curative to the extrusion reactor. This pre-cure oil may also be referred to as a first amount of oil.

For purposes of this disclosure and unless otherwise indicated, "post-cure" refers to after the addition of a curative to the extrusion reactor. For example, the post-cure oil refers to the oil added to the extrusion reactor after the addition of a curative to the extrusion reactor but before curing is a post-cure oil. This oil may also be referred to as a second amount of oil.

Formulations of the TPV Compositions

In some embodiments, the TPV composition can include an amount of a rubber (e.g., dynamically-vulcanized rubber, e.g., an ethylene based copolymer) of about 25 wt % or more, such as about 45 wt % or more, such as about 65 wt % or more, such as about 75 wt % or more based on a combined weight of the rubber and a thermoplastic polyolefin. In at least one embodiment, the amount of rubber in the TPV composition can be from about 5 wt % to about 95 wt %, such as from about 10 wt % to about 90 wt %, such as from about 20 wt % to about 85 wt %, such as from about 45 wt % to about 80 wt %, such as from about 60 wt % to about 75 wt % based on a combined weight of the rubber and a thermoplastic polyolefin.

In these and other embodiments, the TPV composition can include an amount of a thermoplastic phase (e.g., a thermoplastic polymer or a thermoplastic polyolefin), such as a propylene-based polymer, an ethylene based polymer, a butene-1-based polymer, or combinations thereof, that is from about 10 wt % to about 85 wt % (such as from about 10 wt % so to about 80 wt %, such as from about 10 wt % to about 55 wt %, such as from about 10 wt % to about 50 wt %, such as from about 10 wt % to about 40 wt %, such as from about 12 wt % to about 30 wt %) based on a combined weight of the rubber and the thermoplastic polyolefin. In these or other embodiments, the amount of thermoplastic polymer within the thermoplastic phase may be from about 5 parts per hundred parts by weight of rubber (phr) to about 250 phr (such as from about 10 phr to about 150 phr, such as from about 20 phr to about 150 phr, such as from about 25 phr to about 150 phr, such as from about 50 phr to about 150 phr, such as from about 60 phr to about 100 phr).

With respect to the thermoplastic phase, the amount of polymer present within the phase may vary in the presence of a complementary thermoplastic resin. For example, in some embodiments, the thermoplastic phase may include from about 75 wt % to about 100 wt % butene-1-based polymer (such as from about 65 wt % to about 99.5 wt %, such as from about 85 wt % to about 99 wt %, such as from about 95 wt % to about 98 wt %) based on a total weight of a thermoplastic phase, with balance of the thermoplastic phase including an ethylene based polymer. For example, the thermoplastic phase may include from about 0 wt % to about 25 wt % an ethylene based polymer (such as from about 1 wt % to about 15 wt %, such as from about 2 wt % to about 5 wt %) based on the total weight of the thermoplastic phase.

In these or other embodiments, where the thermoplastic phase may include a propylene-based polymer in addition to the butene-1-based polymer, the thermoplastic phase may include from about 51 wt % to about 100 wt % of butene-1-based polymer (such as from about 65 wt % to about 99.5 wt %, such as from about 85 wt % to about 99 wt %, such as from about 95 wt % to about 98 wt %) based on the total weight of the thermoplastic phase, with balance of the thermoplastic phase including an propylene-based polymer. For example, in some embodiments, the thermoplastic phase may include from about 0 wt % to about 49 wt % of propylene-based polymer (such as from about 1 wt % to about 15 wt %, such as from about 2 wt % to about 5 wt %) based on the total weight of the thermoplastic phase.

In some embodiments, fillers (such as calcium carbonate, clays, silica, talc, titanium dioxide, carbon black, a nucleating agent, mica, wood flour, and the like, and blends thereof, as well as inorganic and organic nanoscopic fillers) may be added to the TPV composition in an amount from about 1 phr to about 250 phr (such as about 10 phr to about 250 phr, such as from about 10 phr to about 150 phr, such as from about 25 phr to about 50 phr). The amount of filler that can be used may depend, at least in part, upon the type of filler and the amount of extender oil (if any) that is used.

In some embodiments, an oil (e.g., an extender oil) and/or a plasticizer may be added to the TPV composition in an amount of from about 5 phr to about 300 phr (such as from about 10 phr t to about 250 phr, such as from about 25 phr to about 250 phr, such as from about 50 phr to about 200 phr, such as from about 50 phr to about 150 phr, such as from about 75 phr to about 130 phr). The quantity of oil added can depend on the properties desired, with an upper limit that may depend on the compatibility of the particular oil and blend ingredients; and this limit may be exceeded when excessive exuding of oil occurs. The amount of oil can depend, at least in part, upon the type of rubber. High viscosity rubbers are more highly oil extendable. Where ester plasticizers are employed, the ester plasticizers are generally used in amounts of about 250 phr or less, such as about 175 phr or less, such as per 100 phr or less.

In some embodiments, an amount of a pre-cure oil and/or a pre-cure plasticizer may be added to the TPV composition. Such amounts added pre-cure may be from about 2 phr to about 150 phr (such as from about 5 phr to about 100 phr, such as from about 10 phr to about 100 phr, such as from about 25 phr to about 100 phr, such as from about 50 phr to about 100 phr, such as from about 75 phr to about 130 phr.

In some embodiments, an amount of a post-cure oil and/or a post-cure plasticizer may be added to the TPV composition. Such amounts added post-cure may be from about 2 to about 150 phr (such as from about 5 phr to about 145 phr, such as from about 10 phr to about 140 phr, such as from about 25 phr to about 135 phr, such as from about 50 phr to about 130 phr, such as from about 75 phr to about 125 phr.

In some embodiments, a weight ratio of the post-cure oil (and/or the post-cure plasticizer) added to the pre-cure oil (and/or the pre-cure plasticizer) added is greater than about 1:1, such as from about 2:1 to about 10:1, such as from about 3:1 to about 8:1.

In some embodiments, a weight ratio of the total oil (and/or plasticizer) added to the pre-cure oil (and/or the pre-cure plasticizer) is less than about 10:1, such as from about 2:1 to about 7:1, such as from about 3:1 to about 5:1.

In some embodiments, the TPV composition includes a curative. Amounts and types of curative, as well as the components of the curative, are discussed below.

In some embodiments, and when employed, the TPV composition may include a processing additive (e.g., a polymeric processing additive) in an amount of from about 0 phr to about 20 phr, such as from about 1 phr to about 10 phr, such as from about 2 phr to about 6 phr.

In some embodiments, the TPV composition may optionally include reinforcing and non-reinforcing fillers, colorants, antioxidants, stabilizers, rubber processing oil, lubricants, antiblocking agents, anti-static agents, waxes, foaming agents, pigments, flame retardants, antistatic agents, slip masterbatches, ultraviolet inhibitors, antioxidants, and other processing aids known in the rubber and TPV compounding art. These additives can be used in the TPV compositions at an amount up to about 50 wt % of the total weight of the TPV composition.

In some embodiments, the TPV composition may include from about 10 wt % to about 85 wt % of the thermoplastic component (such as from about 15 wt % to about 70 wt %, such as from about 20 wt % to about 50 wt %) based upon the entire weight of the rubber and thermoplastic component combined. The amount of the thermoplastic component can also be expressed with respect to the amount of the rubber component. In some embodiments, the TPV compositions may include from about 20 phr to about 400 phr (such as from about 40 phr to about 300 phr, such as from about 80 phr to about 200 phr).

In at least one embodiment, one or more of an oil and/or a plasticizer can be added during fabrication of the TPV composition before the addition of a curative and/or after the addition of a curative. The amount of the one or more of an oil and/or plasticizer added before the curative (the pre-cure oil and/or pre-cure plasticizer), based on the total amount of oil added, may be from about 1 wt % to about 49 wt %, such as from about 5 wt % to about 45 wt %, such as from about 10 wt % to about 40 wt %, such as from about 15 wt % to about 30 wt %, such as from about 20 wt % to about 25 wt %. In at least on embodiment, the amount of the one or more of an oil and/or plasticizer added before the curative, based on the total amount of oil added, may be from about 3 wt % to about 37 wt %, such as from about 10 wt % to about 33 wt %, such as from about 20 wt % to about 30 wt %.

In some embodiments, the amount of the one or more of an oil and/or plasticizer added after the curative (the post-cure oil and/or post-cure plasticizer), based on the total amount of oil added, may be from about 51 wt % to about 99 wt %, such as from about 55 wt % to about 95 wt %, such as from about 60 wt % to about 90 wt %, such as from about 65 wt % to about 85 wt % such as from about 70 wt % to about 75 wt %. In at least on embodiment, the amount of the one or more of an oil and/or plasticizer added after the curative, based on the total amount of oil added, may be from about 63 wt % to about 97 wt %, such as from about 67 wt % to about 90 wt %, such as from about 70 wt % to about 80 wt %.

Rubber Phase

Rubbers that may be employed to form the rubber phase include those polymers that are capable of being cured or crosslinked by a phenolic resin or a hydrosilylation curative (e.g., silane-containing curative), a peroxide with a coagent, a moisture cure via silane grafting, or an azide. Reference to a rubber may include mixtures of more than one rubber. Non-limiting examples of rubbers include olefinic elastomeric terpolymers, and mixtures thereof. In some embodiments, olefinic elastomeric terpolymers include ethylene based elastomers such as ethylene based copolymer rubbers and ethylene-propylene-non-conjugated diene rubbers.

Ethylene Based Copolymer

The term ethylene based copolymer refers to rubbery terpolymers polymerized from ethylene, at least one other α-olefin monomer, and at least one diene monomer (for example, an ethylene-propylene-diene terpolymer or an EPDM terpolymer). The α-olefin monomer may include propylene, 1-butene, 1-hexene, 4-methyl-1-pentene, 1-octene, 1-decene, or combinations thereof. In at least one embodiment, the α-olefin monomer can include propylene, 1-hexene, 1-octene or combinations thereof. The diene monomers may include 5-ethylidene-2-norbornene (ENB); 5-vinyl-2-norbornene (VNB); divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or combinations thereof. Polymers prepared from ethylene, α-olefin monomer, and diene monomer may be referred to as a terpolymer or even a tetrapolymer in the event that multiple α-olefin monomers or dienes are used. An example of an ethylene based copolymer is an ethylene-propylene copolymer rubber (or ethylene-propylene copolymer).

In some embodiments, the ethylene based copolymer may have an ethylene-derived content that is from about 10 wt % to about 99.9 wt % (such as from about 10 wt % to about 90 wt %, such as from about 12 wt % to about 90 wt %, such as from about 15 wt % to about 90 wt %, such as from about 20 wt % to about 80 wt %, such as from about 40 wt % to about 70 wt %, such as from about 50 wt % to about 70 wt %, such as from about 55 wt % to about 65 wt %, such as from about 60 wt % and about 65 wt %) based on a total weight of the ethylene-propylene rubber. In some embodiments, the ethylene-derived content is from about 40 wt % to about 85 wt %, such as from about 40 wt % to about 85 wt %, based on the total weight of the ethylene-propylene rubber.

In some embodiments, the ethylene based copolymer may have a diene-derived content that is from about 0.1 wt % to about to about 15 wt %, such as from about 0.1 wt % to about 5 wt %, such as from about 0.2 wt % to about 10 wt %, such as from about 2 wt % to about 8 wt %, or from about 4 wt % to about 12 wt %, such as from about 4 wt % to about 9 wt %) based on a total weight of the ethylene-propylene rubber. In some embodiments, the diene-derived content can be from about 3 wt % to about 15 wt % based on the total weight of the ethylene-propylene rubber.

In some embodiments, where the diene monomer includes 5-ethylidene-2-norbornene (ENB) and/or 5-vinyl-2-norbornene (VNB), the ethylene based copolymer may include at least about 0.1 wt % of diene monomer (such as at least about 1 wt %, such as at least about 3 wt %, such as at least about 4 wt %, such as at least about 5 wt %) based on a total weight of the ethylene-propylene rubber. In these and other embodiments, where the diene includes ENB or VNB, the ethylene based copolymer may include from about 1 wt % to about 15 wt % of diene monomer (such as from about 3 wt % to about 15 wt %, such as from about 4 wt % to about 12 wt %, such as from about 5 wt % to about 12 wt %, such as from about 7 wt % to about 11 wt %) based on a total weight of the ethylene-propylene rubber.

In some embodiments, the ethylene based copolymer may have an amount of oil that is from about 0 parts per hundred rubber (phr) to about 200 phr, such as from about 0 phr to about 100 phr, such as 75 phr and 100 phr.

In some embodiments, the ethylene based copolymer may have a balance of the ethylene-propylene rubber including α-olefin-derived content (e.g., $C_2$ to $C_{40}$, such as $C_3$ to $C_{20}$, such as $C_3$ to $C_{10}$ olefins, such as propylene).

In some embodiments, the ethylene based copolymer may have a weight average molecular weight (Mw) that is about 100,000 g/mol or more (such as about 200,000 g/mol or more, such as about 400,000 g/mol or more, such as about 600,000 g/mol or more). In these or other embodiments, the Mw can be about 1,200,000 g/mol or less (such as about 1,000,000 g/mol or less, such as about 900.000 g/mol or less, such as about 800,000 g/mol or less, such as from about 400,000 g/mol to about 700,000 g/mol). In these or other embodiments, the Mw can be from about 400,000 g/mol and about 3,000,000 g/mol (such as from about 400,000 g/mol to about 2,000,000, such as from about 400,000 g/mol to about 1,500,000 g/mol, such as from about 400,000 g/mol to about 1,000,000 g/mol or from about 600,000 g/mol to about 1,200,000 g/mol, such as from about 600,000 g/mol to about 1,000,000 g/mol).

In some embodiments, the ethylene based copolymer may have a number average molecular weight (Mn) that is about 20,000 g/mol or more (such as about 60,000 g/mol or more, such as about 100,000 g/mol or more, such as about 150,000 g/mol or more). In these or other embodiments, the Mn can be less than about 500,000 g/mol (such as about 400,000 g/mol or less, such as about 300,000 g/mol or less, such as about 250,000 g/mol or less).

In some embodiments, the ethylene based copolymer may have a Z-average molecular weight (Mz) that is from about 10,000 g/mol to about 7,000,000 g/mol (such as from about 50,000 g/mol to about 3,000,000 g/mol, such as from about 100,000 g/mol to about 2,000,000 g/mol, such as from about 200,000 g/mol to about 1,500,000 g/mol, such as from about 200,000 g/mol to about 1,00,000 g/mol, such as from about 200,000 g/mol to about 500,000 g/mol).

In some embodiments, the ethylene based copolymer may have a polydispersity index (Mw/Mn; PDI) that is from about 1 to about 15 (such as from about 1 to about 10, such as from about 1 to about 5, such as from about 1 to about 4, such as from about 2 to about 4 or from about 1 to about 3, such as from about 1.8 to about 3 or from about 1 to about 2, or from about 1 to about 2.5).

In some embodiments, the ethylene based copolymer may have a dry Mooney viscosity ($ML_{(1+4)}$ at 125° C.) per ASTM D1646, that is from about 10 MU to about 500 MU or from about 50 MU to about 450 MU. In these or other embodiments, the Mooney viscosity is about 50 or more, such as about 250 MU or more, such as about 350 MU or more.

In some embodiments, the ethylene based copolymer may have a $g'_{vis}$ that is 0.7 or more (such as about 0.75 or more, such as about 0.8 or more, 0.85 or more, such as 0.9 or more, such as 0.95 or more, for example about 0.96, about 0.97, about 0.98, about 0.99, or about 1).

In some embodiments, the ethylene-propylene rubber may have a glass transition temperature ($T_g$), as determined by Differential Scanning Calorimetry (DSC) according to ASTM E1356, that is about −20° C. or less (such as about −30° C. or less, such as about −50° C. or less). In some embodiments, $T_g$ is from about −20° C. and about −60° C.

In some embodiments, the ethylene based copolymer may have a large amplitude oscillatory shear (LAOS) branching index of less than about 10, such as less than about 5, such as from about −1 to about 5. In at least one embodiment, the ethylene based copolymer may have a LAOS branching index of less than about 3.

In some embodiments, the ethylene based copolymer may have a LCB index (@125° C. of about 2.5 or lower such as about 2.0 or lower.

In at least one embodiment, the ethylene based copolymer may have a Δδ of from about 30 degrees to 80 degrees from small amplitude oscillatory shear (SAOS), such as about 32° or greater, such as about 35° or greater. Δδ is the difference between the phase angle (δ) at frequencies of 0.1 and 128 rad/s, as derived from a frequency sweep at 125° C., i.e., where Δδ(125° C.)=δ(0.1 rad/s)−δ(128 rad/s).

The ethylene based copolymer may be manufactured or synthesized by using a variety of techniques. For example, these terpolymers can be synthesized by employing solution, slurry, or gas phase polymerization techniques or combination(s) thereof that employ various catalyst systems including Ziegler-Natta systems including vanadium catalysts and take place in various phases such as solution, slurry, or gas phase. Exemplary catalysts include single-site catalysts including constrained geometry catalysts involving Group IV-VI metallocenes. In some embodiments, the EPDMs can be produced via a conventional Zeigler-Natta catalysts using a slurry process, especially those including Vanadium compounds, as disclosed in U.S. Pat. No. 5,783,645, as well as metallocene catalysts, which are also disclosed in U.S. Pat. No. 5,756,416. Other catalyst systems such as the Brookhart catalyst system may also be employed. Optionally, such EPDMs can be prepared using the above catalyst systems in a solution process.

In some embodiments, the rubber can be highly cured. In some embodiments, the rubber is advantageously partially or fully (completely) cured. The degree of cure can be measured by determining the amount of rubber that is extractable from the TPV composition by using cyclohexane or boiling xylene as an extractant. This method is disclosed in U.S. Pat. No. 4,311,628, which is incorporated herein by reference for purpose of U.S. patent practice. In some embodiments, the rubber has a degree of cure where not more than about 5.9 wt %, such as not more than about 5 wt %, such as not more than about 4 wt %, such as not more than about 3 wt % is extractable by cyclohexane at 23° C. as described in U.S. Pat. Nos. 5,100,947 and 5,157,081, which are incorporated herein by reference for purpose of U.S. patent practice. In these or other embodiments, the rubber is cured to an extent where greater than about 94 wt %, such as greater than about 95 wt %, such as greater than about 96 wt %, such as greater than about 97 wt % by weight of the rubber is insoluble in cyclohexane at 23° C. Alternately, in some embodiments, the rubber has a degree of cure such that the crosslink density is at least $4 \times 10^{-5}$ moles per milliliter of rubber, such as at least $7 \times 10^{-5}$ moles per milliliter of rubber, such as at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Despite the fact that the rubber may be partially or fully cured, the TPV compositions of this disclosure can be processed and reprocessed by conventional plastic processing techniques such as extrusion, injection molding, blow molding, and/or compression molding to form an article. The rubber within these thermoplastic elastomers can be in the form of finely-divided and well-dispersed particles of vulcanized or cured rubber within a continuous thermoplastic phase or matrix. In some embodiments, a co-continuous morphology or a phase inversion can be achieved. In those embodiments where the cured rubber is in the form of finely-divided and well-dispersed particles within the thermoplastic medium, the rubber particles can have an average diameter that is about 50 μm or less (such as about 30 μm or less, such as about 10 μm or less, such as about 5 μm or less, such as about 1 μm or less). In some embodiments, at least about 50%, such as about 60%, such as about 75% of the particles have an average diameter of about 5 μm or less, such as about 2 μm or less, such as about 1 μm or less.

Some elastomeric terpolymers are commercially available under the tradenames Vistalon™ (ExxonMobil Chemical Co.; Houston, Tex.), Keltan™ (Arlanxeo Performance Elastomers; Orange, TX.), Nordel™ IP (Dow), NORDEL MG™ (Dow), Royalene™ (Lion Elastomers), and Suprene™ (SK Global Chemical). Specific examples include Vistalon™ 3666, EXP-Vistalon (made according to WO2017127184A1), Keltan™ 5469 Q, Keltan™ 4969 Q, Keltan™ 5469 C, Keltan™ 4869 C, Royalener™ 694, Royalene™ 677, Suprene™ 512F, Nordel™ 6555, Keltan 5467C, and Nordel™ 4555OE.

In some embodiments, the ethylene propylene rubber may be obtained in an oil extended form, with about a 50 phr to about 200 phr process oil, such as about 75 phr to about 120 phr process oil on the basis of 100 phr of ethylene propylene rubber.

Table 1 shows the characteristics of example ethylene propylene rubbers. $g'_{vis}$ can be measured using GPC-4D. Branching Index, BI, (LAOS) can be measured using an APA rheometer at 125° C. The phase angle difference (Δδ) (SAOS) can be measured using an APA rheometer at 125° C., defined as the difference in phase angle δ(@0.1 1/s)–phase angle δ(@128 1/s). Techniques for determining the molecular properties are described below.

In Table 1, EPDM 1 was made according to PCT Publication No. WO 2017/127184, which is incorporated by reference herein.

TABLE 1

| Grade | % C2 | % ENB | Oil (phr) | Mw (g/mol) | Mz (g/mol) | Mw/Mn | $g'_{vis}$ | BI (LAOS) | Δδ (SAOS) |
|---|---|---|---|---|---|---|---|---|---|
| Vistalon 3666 | 64 | 4.2 | 75 | 509,000 | 1,474,600 | 4.0 | 0.867 | 3.8 | 26.5 |
| EPDM 1 | 54 | 10 | 0 | 416,600 | 1,741,400 | 9.5 | 0.735 | 4.3 | 31.0 |
| Keltan 4969Q | 69 | 9.8 | 100 | 507,000 | 931,000 | 2.6 | 0.977 | 0.5 | 36.1 |
| Keltan 5469Q | 61 | 4 | 100 | 600,000 | 1,064,000 | 2.5 | 1 | −0.5 | 39.3 |

Values listed are approximate values.

Thermoplastic Phase

In some embodiments, the thermoplastic phase of the TPV composition includes a polymer that can flow above its melting temperature. In some embodiments, the major component of the thermoplastic phase includes at least one thermoplastic polyolefin such as a polypropylene (such as a homopolymer, random copolymer, or impact copolymer, or combination thereof), an ethylene based polymer (e.g., a polyethylene), or a butene-based polymer (e.g., polybutene). In some embodiments, the thermoplastic phase may also include, as a minor constituent, at least one thermoplastic polyolefin such as an ethylene based polymer (e.g., a polyethylene), a propylene-based polymer (e.g., a polypropylene), or a butene-based polymer (e.g., a polybutene or a polybutene-1).

1. Propylene-Based Polymer

Propylene-based polymers include those solid, generally high molecular weight plastic resins that primarily include units deriving from the polymerization of propylene. In some embodiments, at least 75%, in other embodiments at least 90%, in other embodiments at least 95%, and in other embodiments at least 97% of the units of the propylene-based polymer derive from the polymerization of propylene. In some embodiments, these polymers include homopolymers of propylene. Homopolymer polypropylene can include linear chains and/or chains with long chain branching.

In some embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ olefins.

In some embodiments, the propylene-based polymer includes semi-crystalline polymers. In some embodiments, these polymers may be characterized by a crystallinity of at least 25 wt % or more (such as about 55 wt % or more, such as about 65 wt % or more, such as about 70 wt % or more). Crystallinity may be determined by dividing the heat of fusion (Hf) of a sample by the heat of fusion of a 100% crystalline polymer, which is assumed to be 209 joules/gram for polypropylene.

In some embodiments, the propylene-based polymer may have an Hf of about 52.3 J/g or more (such as about 100 J/g or more, such as about 125 J/g or more, such as about 140 J/g or more).

In some embodiments, the propylene-based polymer may have a weight average molecular weight (Mw) of from about 50,000 g/mol to about 2,000,000 g/mol (such as from about 100,000 g/mol to about 1,000,000 g/mol, such as from about 100,000 g/mol to about 600,000 g/mol or from about 400,000 g/mol to about 800,000 g/mol) as measured by GPC with polystyrene standards.

In some embodiments, the propylene-based polymer may have a number average molecular weight (Mn) of from about 25,000 g/mol to about 1,000,000 g/mol (such as from about 50,000 g/mol to about 300,000 g/mol) as measured by GPC with polystyrene standards.

In some embodiments, the propylene-based polymer may have a $g'_{vis}$ of about 1 or less (such as 0.9 or less, such as 0.8 or less, such as 0.6 or less, such as 0.5 or less). In some embodiments, the polypropylene may have a $g'_{vis}$ that is greater than about 0.90, such as greater than about 0.97. In some embodiments, the polypropylene has a $g'_{vis}$ that is from about 0.7 to about 0.88.

In some embodiments, the propylene-based polymer may have a melt mass flow rate (MFR) (ASTM D1238, 2.16 kg weight @ 230° C.) of about 0.1 g/10 min or more (such as about 0.2 g/10 min or more, such as about 0.2 g/10 min or more). Alternately, the MFR may be from about 0.1 g/10 min to about 50 g/10 min, such as from about 0.5 g/10 min to about 5 g/10 min, such as from about 0.5 g/10 min to about 3 g/10 min.

In some embodiments, the propylene-based polymer may have a melt temperature ($T_m$) of from about 110° C. to about 170° C. (such as from about 140° C. to about 168° C., such as from about 160° C. to about 165° C.).

In some embodiments, the propylene-based polymer may have a glass transition temperature ($T_g$) of from about −50° C. to about 10° C. (such as from about −30° C. to about 5° C., such as from about −20° C. to about 2° C.).

In some embodiments, the propylene-based polymer has a crystallization temperature ($T_c$) that can be about 75° C. or more (such as about 95° C. or more, such as about 100° C. or more, such as about 105° C. or more (such as from about 105° C. to about 130° C.).

In some embodiments, the propylene-based polymers can include a homopolymer of a high-crystallinity isotactic or syndiotactic polypropylene. This polypropylene can have a density of from about 0.89 to about 0.91 g/ml, with the largely isotactic polypropylene having a density of from about 0.90 to about 0.91 g/ml. Also, high and ultra-high molecular weight polypropylene that has a fractional melt flow rate can be employed. In some embodiments, polypropylene resins may be characterized by a MFR (ASTM D-1238; 2.16 kg @ 230° C.) that is about 10 dg/min or less (such as about 1.0 dg/min or less, such as about 0.5 dg/min or less).

In some embodiments, the polypropylene can include a homopolymer, random copolymer, or impact copolymer polypropylene or combination thereof. In some embodiments, the polypropylene is a high melt strength (HMS) long chain branched (LCB) homopolymer polypropylene.

The propylene-based polymers may be synthesized by using an appropriate polymerization technique known in the art such as the conventional Ziegler-Natta type polymerizations, and catalysis employing single-site organometallic catalysts including metallocene catalysts.

Examples of polypropylene useful for the TPV compositions described herein include ExxonMobil™ PP5341 (available from ExxonMobil); Achiever™ PP6282NE1 (available from ExxonMobil) and/or polypropylene resins with broad molecular weight distribution as described in U.S. Pat. Nos. 9,453,093 and 9,464,178; and other polypropylene resins described in US20180016414 and US20180051160 (for example, EXP-PP, as shown in the Table below); Waymax™ MFX6 (available from Japan Polypropylene Corp.); Borealis Daploy™ WB140 (available from Borealis AG); and Braskem Ampleo 1025MA and Braskem Ampleo 1020GA (available from Braskem Ampleo). Table 2 shows the characteristics of selected propylene based polymers. $g'_{vis}$ can be measured using GPC-4D. Techniques for determining the molecular properties are described below.

TABLE 2

| Grade | Mw (g/mol) | Mw/Mn | LCB-$g'_{vis}$ |
|---|---|---|---|
| ExxonMobil ™ PP5341 | 562,000 | 7.5 | 1.000 |
| EXP-PP | 540,000 | 16 | 0.857 |

$g'_{vis}$ is measured using GPC-4D.

2. Ethylene Based Polymer

Ethylene based polymers include those solid, generally high-molecular weight plastic resins that primarily include units deriving from the polymerization of ethylene. In some embodiments, at least 90%, in other embodiments at least 95%, and in other embodiments at least 99% of the units of the ethylene based polymer can derive from the polymerization of ethylene. In particular embodiments, these polymers include homopolymers of ethylene.

In some embodiments, the ethylene based polymers may also include units deriving from the polymerization of α-olefin comonomer such as propylene, 1-butene, 1-hexene, 1-octene, 2-methyl-1-propene, 3-methyl-1-pentene, 4-methyl-1-pentene, 5-methyl-1-hexene, and mixtures thereof.

In some embodiments, the ethylene based polymer may have a melt index (MI) (ASTM D1238, 2.16 kg@190° C.) of from about 0.1 dg/min to about 1,000 dg/min (such as from about 1.0 dg/min to about 200 dg/min, such as from about 7.0 dg/min to about 20.0 dg/min).

In some embodiments, the ethylene based polymer may have a melt temperature ($T_m$) of from about 140° C. to about 90° C. (such as from about 135° C. to about 125° C., such as from about 130° C. to about 120° C.), as measured by Differential Scanning Calorimetry (DSC) at 10° C./min.

The ethylene based polymers may be synthesized by using an appropriate polymerization technique known in the art such as the conventional Ziegler-Natta type polymerizations, and catalysis employing single-site organometallic catalysts including metallocene catalysts. Some ethylene based polymers are commercially available. For example, polyethylene is commercially available under the tradename ExxonMobil™ Polyethylene (ExxonMobil). ethylene based copolymers are commercially available under the tradename ExxonMobil™ Polyethylene (ExxonMobil), which include metallocene produced linear low density polyethylene including Exceed™, Enable™, and Exceed™ XP.

In some embodiments, the ethylene based polymer can include a low density polyethylene, a linear low density polyethylene, or a high density polyethylene. In some embodiments, the ethylene based polymer can be a high melt strength (HMS) long chain branched (LCB) homopolymer polyethylene.

Other ethylene based polymers that can be used include Hostalen (LBI), Paxxon (ExxonMobil) and Escorene (ExxonMobil).

3. 1-Butene-Based Polymer

Butene-1-based polymers include those solid, generally high-molecular weight isotactic butene-1 resins that primarily include units deriving from a polymerization of 1-butene.

In some embodiments, the 1-butene-based polymers can include isotactic poly(butene-1) homopolymers. In some embodiments, the 1-butene-based polymers may also include units deriving from the polymerization of an α-olefin comonomer such as ethylene, propylene, 1-butene, 1-hexane, 1-octene, 4-methyl-1-pentene, 2-methyl-1-propene, 3-methyl-1-pentene, 4-methyl-1-pentene, 5-methylhexene, and mixtures of two or more thereof.

In some embodiments, the 1-butene-based polymer includes one or more of the following characteristics:

In some embodiments, the 1-butene-based polymer can have at least 90 wt % or more of the units of the 1-butene-based polymer derive from the polymerization of 1-butene (such as about 95 wt % or more, such as about 98 wt % or more, such as about 99 wt % or more). In some embodiments, these polymers can include homopolymers of 1-butene.

In some embodiments, the 1-butene-based polymer can have a melt index (MI) (ASTM D1238, 2.16 kg @ 190° C.) that can be about 0.1 dg/min to 800 dg/min (such as from about 0.3 dg/min to about 200 dg/min, such as from about 0.3 dg/min to about 4.0 dg/min). In these or other embodiments, a MI can be about 500 dg/min or less (such as about 100 dg/min or less, such as about 10 dg/min or less, such as about 5 dg/min or less).

In some embodiments, the 1-butene-based polymer can have a melt temperature ($T_m$) that can be from about 130° C. to about 110° C. (such as from about 125° C. to about 115° C., such as from about 125° C. to about 120° C.), as measured by DSC at 10° C./min.

In some embodiments, the 1-butene-based polymer can have a density, as determined according to ASTM D792 that can be from about 0.897 g/ml to about 0.920 g/ml, such as from about 0.910 g/ml to about 0.920 g/ml. In these or other embodiments, a density that can be about 0.910 g/ml or more, such as 0.915 g/ml or more, such as about 0.917 g/ml or more.

The 1-butene-based polymers may be synthesized by using an appropriate polymerization technique known in the art such as the conventional Ziegler-Natta type polymerizations, and catalysis employing single-site organometallic catalysts including metallocene catalysts. Some 1-butene-based polymers are commercially available. For example, isotactic poly(1-butene) is commercially available under the tradename Polybutene Resins or PB (Basell).

Other Constituents

In some embodiments, the TPV composition may include a polymeric processing additive. The processing additive may be a polymeric resin that has a very high melt flow index. These polymeric resins include both linear and branched polymers that have a melt flow rate that is about 500 dg/min or more, such as about 750 dg/min or more, such as about 1000 dg/min or more, such as about 1200 dg/min or more, such as about 1500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. TPV compositions that include similar processing additives are disclosed in U.S. Pat. No. 6,451,915, which is incorporated herein by reference for purpose of U.S. patent practice.

In some embodiments, the TPV compositions of the present disclosure may optionally include reinforcing and non-reinforcing fillers, compatibilizers, antioxidants, stabilizers, rubber processing oil, lubricants, antiblocking agents, anti-static agents, waxes, foaming agents, pigments, flame retardants, nucleating agents, and other processing aids known in the rubber compounding art. These additives can be used in the TPV compositions at an amount up to about 50 wt % of the total weight of the TPV composition.

Fillers and extenders that can be utilized include conventional inorganics such as calcium carbonate, clays, silica, talc, titanium dioxide, carbon black, a nucleating agent, mica, wood flour, and the like, and blends thereof, as well as inorganic and organic nanoscopic fillers.

In some embodiments, the TPV compositions may include a plasticizer such as an oil, such as a mineral oil, a synthetic oil, an ester plasticizer, or combinations thereof. These oils may also be referred to as plasticizers or extenders. Mineral oils may include aromatic oils, naphthenic oils, paraffinic oils, isoparaffinic oils, synthetic oils, and combinations thereof. In some embodiments, the mineral oils may be treated or untreated. Useful mineral oils can be obtained under the tradename SUNPAR™ (Sun Chemicals). Other oils are available under the tradename PARALUX™ (Chevron), and PARAMOUNT™ (Chevron) such as Paramount™ 6001R (Chevron Phillips). Other oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Examples of oils include base stocks. According to the American Petroleum Institute (API) classifications, base stocks are categorized in five groups based on their saturated hydrocarbon content, sulfur level, and viscosity index (Table 3). Lube base stocks are typically produced in large scale from non-renewable petroleum sources. Group I, II, and III base stocks are all derived from crude oil via extensive processing, such as solvent extraction, solvent or catalytic dewaxing, and hydroisomerization, hydrocracking and isodewaxing, isodewaxing and hydrofinishing. See "New Lubes Plants Use State-of-the-Art Hydrodewaxing Technology" in Oil & Gas Journal, Sep. 1, 1997; Krishna et al., "Next Generation Isodewaxing and Hydrofinishing Technology for Production of High Quality Base Oils", 2002 NPRA Lubricants and Waxes Meeting, Nov. 14-15, 2002; Gedeon and Yenni, "Use of "Clean" Paraffinic Processing Oils to Improve TPE Properties", Presented at TPEs 2000 Philadelphia, PA., Sep. 27-28, 1999.

Group III base stocks can also be produced from synthetic hydrocarbon liquids obtained from natural gas, coal or other fossil resources, Group IV base stocks are polyalphaolefins (PAOs), and are produced by oligomerization of alpha olefins, such as 1-decene. Group V base stocks include all base stocks that do not belong to Groups I-IV, such as naphthenics, polyalkylene glycols (PAG), and esters.

TABLE 3

| API Classification | Group I | Group II | Group III | Group IV | Group V |
|---|---|---|---|---|---|
| % Saturates | <90 | ≥90 | ≥90 | Polyalpha-olefins (PAOs) | All others not belonging to Groups I-IV |
| % S | >0.03 | ≤0.03 | ≤0.03 | | |
| Viscosity Index (VI) | 80-120 | 80-120 | ≥120 | | |

In some embodiments, the Group II base stocks include, based on the total weight of the base stock, a total amount of aromatic compounds and polar compounds of greater than about 4.5 wt % or less than about 4.5 wt %, as measured according to ASTM 2007, and/or the viscosity of the oil is at least about 80 cSt at 40° C.

In some embodiments the mineral oil can have a viscosity of at least 10 cSt at 100° C.

In some embodiments the oil may include, based on the total weight of the oil, less than about 4 wt % of aromatic compounds and/or less than about 0.3 wt % of polar compounds, as measured according to ASTM 2007.

In some embodiments, synthetic oils include polymers and oligomers of butenes. For example, a synthetic oil can be an oligomer of 1-butene. In some embodiments, the oligomeric forms of synthetic oils can be characterized by a number average molecular weight (Mn) of from about 300 g/mol to about 9,000 g/mol, and in other embodiments from about 700 g/mol to about 1,300 g/mol. In some embodiments, these oligomers include isobutenyl mer units. Exemplary synthetic oils include polyisobutylene, poly(isobutylene-co-butene), and mixtures thereof. In some embodiments, synthetic oils may include polylinear α-olefins, poly-branched α-olefins, hydrogenated polyalphaolefins, and mixtures thereof.

In some embodiments, the synthetic oils include synthetic polymers or copolymers having a viscosity of about 20 cps or more, such as about 100 cps or more, such as about 190 cps or more, where the viscosity is measured by a Brookfield viscometer according to ASTM D-4402 at 38° C. In these or other embodiments, the viscosity of these oils can be about 4,000 cps or less, such as about 1,000 cps or less.

In some embodiments, the oil has a DMSO extract of less than 3 wt % measured according to IP-346.

Useful synthetic oils can be commercially obtained under the tradenames Polybutene™ (Soltex; Houston, Tex.), and Indopol™ (Ineos). White synthetic oil is available under the tradename SPECTRASYN™ (ExxonMobil), formerly SHF Fluids (Mobil), Elevast™ (ExxonMobil), and white oil produced from gas to liquid technology such as Risella™ X 415/420/430 (Shell) or Primol™ (ExxonMobil) series of white oils, e.g. Primol™ 352, Primol™ 382, Primol™ 542, or Marcol™ 82, Marcol™ 52, Drakeol™ (Pencero) series of white oils, e.g. Drakeol™ 34 or combinations thereof. Oils described in U.S. Pat. No. 5,936,028 may also be employed.

Preparation of the TPV Compositions

In some embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic. The rubber can be cured by employing a variety of curative systems that include curatives. Exemplary curatives include phenolic resin cure systems, peroxide cure systems, silicon-based cure systems (such as hydrosilylation and silane grafting followed by moisture cure), sulfur-based cure systems, or combinations thereof.

Dynamic vulcanization can occur in the presence of the thermoplastic polyolefin can be added after dynamic vulcanization (e.g., post added), or both (e.g., some long-chain branched polyolefin can be added prior to dynamic vulcanization and some long-chain branched polyolefin can be added after dynamic vulcanization). The increase in crystallization temperature of the TPV composition of some embodiments of the present disclosure can be advantageously increased when dynamic vulcanization occurs in the presence of the high viscosity, long-chain branched polyolefin.

In some embodiments, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing TPV compositions are described in U.S. Pat. Nos. 4,311,628, 4,594,390, 6,503,984, and 6,656,693, although methods employing low shear rates can also be used. Multiple-step processes can also be employed whereby ingredients, such as additional thermoplastic resin, can be added after dynamic vulcanization has been achieved as disclosed in International Application No. PCT/US04/30517.

Useful phenolic cure systems are disclosed in U.S. Pat. Nos. 2,972,600, 3,287,440, 5,952,425 and 6,437,030.

In some embodiments, phenolic resin curatives include resole resins, which can be made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may have from about 1 carbon atom to about 10 carbon atoms, such as dimethylolphenols or phenolic resins, substituted in para-positions with alkyl groups having from about 1 carbon atom to about 10 carbon atoms. In some embodiments, a blend of octylphenol-formaldehyde and nonylphenol-formaldehyde resins is employed. The blend includes from about 25 wt % to about 40 wt % octylphenol-formaldehyde and from about 75 wt % to about 60 wt % nonylphenol-formaldehyde, such as from about 30 wt % to about 35 wt % octylphenol-formaldehyde and from about 70 wt % to about 65 wt % nonylphenol-formaldehyde. In some embodiments, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins.

An example of a phenolic resin curative includes that defined according to the general formula

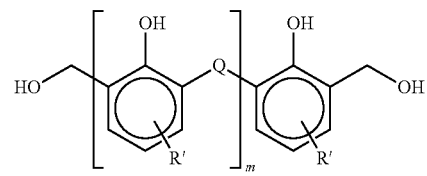

where Q is a divalent radical selected from the group consisting of —CH$_2$—, —CH$_2$—O—CH$_2$—; m is zero or a positive integer from 1 to 20 and R' is an organic group. In some embodiments, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having from 4 to 12 carbon atoms.

In some embodiments, the phenolic resin is used in combination with a halogen source, such as stannous chloride, and metal oxide or reducing compound such as zinc oxide.

In some embodiments, the phenolic resin may be employed in an amount of from about 1 phr to about 10 phr, such as about 2 phr to about 6 phr, such as from about 3 phr to about 5 phr, such as from about 4 phr to about 5 phr. A complementary amount of stannous chloride (which may be a masterbatch, e.g., SnCl$_2$-45% Masterbatch) may include from about 0.5 phr to about 2.0 phr, such as from about 1 phr to about 2.0 phr, such as from about 1.0 phr to about 1.5 phr, such as from about 1.2 phr to about 1.3 phr per 100 phr. In conjunction therewith, zinc oxide may be in an amount of from about 0.05 phr to about 6 phr, such as about 0.1 phr to about 5.0 phr, such as from about 1.0 phr to about 5.0 phr, such as from about 2.0 phr to about 4.0 phr. In some embodiments, the olefinic rubber employed with the phenolic curatives includes diene units deriving from 5-ethylidene-2-norbornene.

In some embodiments, useful peroxide curatives include organic peroxides. Examples of organic peroxides include di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of TPV compositions are disclosed in U.S. Pat. No. 5,656,693, which is incorporated herein by reference for purpose of U.S. patent practice.

In some embodiments, the peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2-polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, and oximes such as quinone dioxime. In order to maximize the efficiency of peroxide/coagent crosslinking the mixing and dynamic vulcanization may be carried out in a nitrogen atmosphere.

In some embodiments, silicon-containing cure systems may include silicon hydride compounds having at least two Si—H groups. Silicon hydride compounds that are useful in practicing the present disclosure include methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include transition metals of Group VIII. These metals include palladium, rhodium, and platinum, as well as complexes of these metals. Useful silicon-containing curatives and cure systems are disclosed in U.S. Pat. Nos. 5,936,028, 4,803,244, 5,672,660, and 7,951,871.

In some embodiments, the silane-containing compounds may be employed in an amount from about 0.5 phr to about 5.0 phr (such as from about 1.0 phr to about 4.0 phr, such as from about 2.0 phr to about 3.0 phr). A complementary amount of catalyst may include from about 0.5 parts of metal to about 20.0 parts of metal per million parts by weight of the rubber (such as from about 1.0 parts of metal to about 5.0 parts of metal, such as from about 1.0 parts of metal to about 2.0 parts of metal). In some embodiments, the olefinic rubber employed with the hydrosilylation curatives includes diene units deriving from 5-vinyl-2-norbornene.

The skilled artisan will be able to readily determine a sufficient or effective amount of vulcanizing agent to be employed without undue calculation or experimentation.

For example, a phenolic resin can be employed in an amount of about 2 phr to about 10 phr (such as from about 3.5 phr to about 7.5 phr, such as from about 5 phr to about 6 phr). In some embodiments, the phenolic resin can be employed in conjunction with stannous chloride and optionally zinc oxide. The stannous chloride can be employed in an amount from about 0.2 phr to about 10 phr (such as from about 0.3 phr to about 5 phr, such as from about 0.5 phr to about 3 phr). The zinc oxide can be employed in an amount from about 0.25 phr to about 5 phr (such as from about 0.5 phr to about 3 phr, such as from about 1 phr to about 2 phr).

Alternately, in some embodiments, a peroxide can be employed in an amount from about 1-10-5 moles to about $1 \times 10^{-1}$ moles, such as from about $1 \times 10^{-4}$ moles to about $9 \times 10^{-2}$ moles, such as from about $1 \times 10^{-2}$ moles to about $4 \times 10^{-2}$ moles per 100 parts by weight of the rubber. The amount may also be expressed as a weight per 100 parts by weight of the rubber. This amount, however, may vary depending on the curative employed. For example, where 4,4-bis(tert-butyl peroxy) diisopropyl benzene is employed, the amount employed may include from about 0.5 parts by weight to about 12 parts by weight, such as from about 1 parts by weight to about 6 parts by weight per 100 parts by weight of the rubber. The skilled artisan will be able to readily determine a sufficient or effective amount of coagent that can be used with the peroxide without undue calculation or experimentation. In some embodiments, the amount of coagent employed is similar in terms of moles to the number of moles of curative employed. The amount of coagent may also be expressed as weight per 100 parts by weight of the rubber. For example, where the triallylcyanurate coagent is employed, the amount employed can include from about 0.25 phr to about 20 phr, such as from about 0.5 phr to about 10 phr, based on 100 parts by weight of the rubber.

Properties of the TPV Compositions

In some embodiments, the TPV compositions described herein can have one or more of the following characteristics.

In some embodiments, the TPV composition can include a polyolefin, such as a polypropylene. For example, the polypropylene may have an MFR from about 0.1 g/10 min to about 50 g/10 min (such as from about 0.5 g/10 min to 10 g/10 min, such as from about 0.5 g/10 min to about 3 g/10 min), and a weight average molecular weight (Mw) from about 100,000 g/mol to about 1,000,000 g/mol (such as from about 100,000 g/mol to about 600,000 g/mol or from about 400,000 g/mol to about 800.000 g/mol), where the polypropylene includes a homopolymer, random copolymer, or impact copolymer polypropylene or a combination thereof. In some embodiments, the polypropylene is a high melt strength (HMS) long chain branched (LCB) homopolymer polypropylene.

In some embodiments, the TPV composition may have a hardness of from about 20 Shore A to about 60 Shore D, such as from about 40 Shore A to about 80 Shore A, such as from about 50 Shore A to about 70 Shore A, such as from about 55 Shore A to about 70 Shore A.

In some embodiments, the TPV composition may have a tensile strength in the transverse direction of from about 2 MPa to about 9 MPa, such as from about 2 MPa to about 8 MPa, such as from about 3 MPa to about 8 MPa, such as from about 5 MPa to about 7 MPa.

In some embodiments, the TPV composition may have an elongation at break (%) in the transverse direction of from about 150% to about 600%, such as from about 150% to about 500%, such as from about 200% to about 450%.

In some embodiments, the TPV composition may have a tension set in the transverse direction of from about 8% to about 19%, such as from about 10% to about 17%, such as from about 10% to about 15%, such as from about 12% to about 15%. In at least one embodiment, the TPV composition may have a tension set of about 16% or less, such as about 14% or less.

In some embodiments, the TPV composition may have a weight gain (24 h @121° C.) of from about 30% to about 100%, such as from about 40% to about 80%, such as from about 50% to about 80%, such as from about 60% to about 80%. This weight gain measurement refers to the weight gain after the TPV sample is immersed in ASTM IRM903 oil at 121° C. after 24 hours.

In some embodiments, the TPV composition may have an extrusion surface roughness ("ESR") of less than about 200 μin, such as from about 50 μin to about 150 μin, such as from about 58 μin to about 120 μin.

In some embodiments, the TPV composition may have a die pressure of from about 50 psi to about 300 psi, such as from about 70 psi to about 200 psi, such as from about 80 psi to about 150 psi, such as from about 90 psi to about 130 psi, based on runs on a 1.5" (screw diameter) Davis-Standard single screw extruder.

In some embodiments, the TPV composition may have a shear modulus (G') value (@ 90° C., 0.6 rad/s, and 1% strain) of from about 600 kPa to about 2000 kPa, such as from about 700 kPa to about 1500 kPa, such as from about 800 kPa to about 1500 kPa.

Tensile elasticity (E') can be calculated, for example, by the first formula below, where δ is the phase angle of the responding force from the experiment:

$$E'=(stress/strain)\cos(\delta)$$

$$E''=(stress/strain)\sin(\delta)$$

$$E^*(\omega)=E'(\omega)+iE''(\omega)$$

And tan delta, in bending deformation test, is related to the dynamic moduli according to:

$$\mathrm{Tan}(\delta)=E''/E'$$

In some embodiments, the TPV composition may have a tan δ value (@ 90° C., 5 rad/s, and 1% strain) of from about 0.03 to about 1, such as from about 0.03 to about 0.07.

In some embodiments, the TPV composition may have a tan δ value (@ 215° C., 5.0 rad/s, and 100% strain) of from 0.25 to 1.0.

In some embodiments, the TPV composition may have a complex viscosity (η*, (@215° C.) that can be from about 5000 Pa·s to about 35000 Pa·s, such as from about 10000 Pa·s to about 26000 Pa·s.

In some embodiments, the TPV composition may have a capillary viscosity (Pa·s) is of from about 20 Pa·s to about 150 Pa·s, such as from about 50 Pa·s to about 110 Pa·s, such as from about 70 Pa·s to about 105 Pa·s, as determined according to ISO 11443 at a shear rate of 1200 s$^{-1}$ at 204° C. In some embodiments, the capillary viscosity may be 100 Pa·s or less. In at least one embodiment, the TPV composition can have a capillary viscosity of 120 Pa·s.

In some embodiments, the TPV composition may include an amount of total surface spots that is from about 0 spots to about 50 spots, such as from about 0 spots to about 30 spots, such as from about 1 spot to about 20 spots.

In some embodiments, the TPV composition may have a stress relaxation slope of about −1 to about −5 (1/min), such as from about −2 to about −4.5 (1/min), as measured by an Elastocon stress relaxation instrument.

In the above characteristics, hardness is measured according to ASTM D2240, tensile strength is measured according to ASTM D412, elongation at break is measured according to ASTM D412, tension set is measured according to ASTM D412, and weight gain is measured according to ASTM D471, and the procedures are provided below. ESR, die pressure, G', tan δ, complex viscosity, capillary viscosity, and total surface spots are measured according to the procedures below.

Method of Making TPV Compositions

In some embodiments, a method of making a TPV composition includes: introducing an ethylene based copolymer to an extrusion reactor; introducing a thermoplastic resin to the extrusion reactor; introducing a filler, an additive, or a combination of filler and additive to the extrusion reactor; introducing a first amount of oil (also known as a pre-cure oil) to the extrusion reactor; introducing a curative to the extrusion reactor; introducing a second amount of oil (also known as a post-cure oil) to the extrusion reactor; and dynamically vulcanizing the ethylene based copolymer with the curative in the presence of the thermoplastic polyolefin to form the TPV composition.

In some embodiments, the ratio of an amount of a post-cure oil to an amount of a pre-cure oil can be tuned in order to provide for various TPV compositions. In some embodiments, the ratio of an amount of a post-cure oil to an amount of a pre-cure oil is greater than 1:1, such as from about 2:1 to about 10:1, such as from about 2:1 to about 8:1, such as from about 2:1 to about 7:1, such as from about 4:1 to about 5:1.

Amounts of the individual components are described herein.

The method of making a TPV composition further includes introducing a filler, an additive, or a combination of filler and additive to the extrusion reactor.

In some embodiments, the extrusion reactor is a twin screw extruder.

End Uses

The TPV compositions of this disclosure are useful for making a variety of molded and extruded articles such as extruded tapes, weather seals (such as a glass run channel weather seal), door panels, hoses, belts, gaskets, moldings, boots, pipe seal, and like articles. They are useful for making articles by blow molding, extrusion, injection molding, thermo-forming, elasto-welding and compression molding techniques. They are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In some embodiments, a method of forming an article includes extruding, injection molding, blow molding, compression molding, thermoforming, or 3D printing any TPV composition described herein; and forming the article. Articles include those articles provided herein.

In some embodiments, the TPV compositions of the present disclosure can be used in thermoforming processes. Thermoforming processes include blow molding (including injection blow molding, extrusion blow molding and press blow molding) and injection molding processes. As those skilled in the art appreciate, these thermoforming processes generally include heating a TPV composition to a temperature that is equal to or in excess of the melt temperature of the TPV composition to form a pre-form, forming the pre-form within a mold to form a molded part, cooling the molded part to a temperature at or below the crystallization temperature of the TPV composition, and releasing the molded part from the mold.

For example, where a TPV composition is injection blow molded, a parison of TPV composition is formed by being molded onto a steel core pin contained within a hot runner mold known as an injection station. While still hot, the pin and parison are transferred to a blowing station where the parison is blown within a mold. The pin, plus the blown part, is then transferred to another station for ejection. In some embodiments, a three station machine is employed. Additional details respecting injection blow molding and extrusion blow molding can be found in THE BEKUM BLOW MOULDING HANDBOOK (Copyright 1989; Tony Whelan).

Another example includes injection molding. Within these processes, a melt of TPV composition is injected from a reservoir through a runner into a cavity within a closed split mold. The mold cavity defines the shape of the molded part. The molded part is cooled within the mold at a temperature at or below the crystallization temperature of the TPV composition, and the molded part can subsequently be ejected from the mold.

In other aspects, the embodiments of the disclosure described herein relate to:

A1. A thermoplastic vulcanizate (TPV) composition, comprising: an ethylene based copolymer, wherein the ethylene based copolymer has an Mw of from 400,000 g/mol to 3,000,000 g/mol, a Mw/Mn of 10 or less, and a $g'_{vis}$ of 0.7 or more; a thermoplastic polyolefin; and one or more of an oil or a plasticizer, wherein: an amount of the one or more of an oil or a plasticizer contained in the ethylene based copolymer of the TPV composition is from 10 parts by weight to 200 parts by weight per 100 parts by weight of the ethylene based copolymer, and the one or more of an oil or a plasticizer is added during a fabrication of the TPV composition before and after an addition of a curative, such that 3 wt % to 37 wt % of a total amount of the one or more of an oil or a plasticizer is added before the curative and 63 wt % to 97 wt % of the one or more of an oil or a plasticizer is added after the curative.

A2. A thermoplastic vulcanizate (TPV) composition, comprising: an ethylene based copolymer, wherein the ethylene based copolymer has an Mw of from 400,000 g/mol to 3,000.000 g/mol, a Mw/Mn of 10 or less, and a $g'_{vis}$ of 0.7 or more; a thermoplastic polyolefin; and one or more of an oil or a plasticizer, wherein an amount of the one or more of an oil or a plasticizer in the TPV composition is from 10 parts by weight to 200 parts by weight per 100 parts by weight of the ethylene based copolymer, and wherein the TPV composition has an extrusion surface roughness that is from 50 μin to 120 μin.

A3. The TPV composition of A1 or A2, wherein the thermoplastic polyolefin has a $g'_{vis}$ of 0.9 or more.

A4. The TPV composition of A3, wherein the thermoplastic polyolefin has a $g'_{vis}$ of 0.97 or more.

A5. The TPV composition of A1 or A2, wherein the thermoplastic polyolefin has a $g'_{vis}$ of less than 0.9.

A6. The TPV composition of A5, wherein the thermoplastic polyolefin has a $g'_{vis}$ of from 0.7 to 0.88.

A7. The TPV composition of any of A1-A6, wherein the ethylene based copolymer is an ethylene-propylene-diene terpolymer.

A8. The TPV composition of any of A1-A7, wherein the oil is a mineral oil, a synthetic oil, an ester plasticizer, or a combination thereof.

A9. The TPV composition of A8, wherein the mineral oil is an aromatic oil, a naphthenic oil, a paraffinic oil, an isoparaffinic oil, a synthetic oil, or a combination thereof.

A10. The TPV composition of A8, wherein the mineral oil is a Group II oil, a total amount of aromatic compounds and polar compounds in the oil is less than 4.5 wt % as measured according to ASTM 2007, and a viscosity of the oil is at least 80 cSt at 40° C.

A11. The TPV composition of A8, wherein the mineral oil is a Group II oil, a total amount of aromatic compounds and polar compounds in the oil is greater than 4.5 wt % as measured according to ASTM 2007, and a viscosity of the oil is at least 80 cSt at 40° C.

A12. The TPV composition of A8, wherein the mineral oil has a viscosity of at least 10 cSt at 100° C.

A13. The TPV composition of A8, wherein the oil has an amount of aromatic compounds of less than 4 wt % and an amount of polar compounds of less than 0.3 wt %.

A14. The TPV composition of A7, wherein the oil has a DMSO extract of less than 3 wt % measured according to IP-346.

A15. The TPV composition of any of A1-A14, further comprising a compatibilizer, a filler, a nucleating agent, or a combination thereof.

A16. The TPV composition of any of 1-15, further comprising calcium carbonate, clay, silica, talc, titanium dioxide, carbon black, mica, wood flour, a nucleating agent, or a combination thereof.

A17. The TPV composition of any of A1-A16, further comprising a curative.

A18. The TPV composition of any of A1-A17, wherein the curative comprises a phenolic resin, a peroxide, a maleimide, a silicon-based curative, a silane-based curative, sulfur-based curative, or a combination thereof.

A19. The TPV composition of A18, wherein the curative is a phenolic resin.

A20. The TPV composition of any of A1-A18, wherein the ethylene based copolymer has an ethylene content of 70 wt % or lower based on a total weight of the ethylene based copolymer.

A21. The TPV composition of any of A1-A18, wherein the ethylene based copolymer has an ethylene content of from 50 wt % to 70 wt % based on a total weight of the ethylene based copolymer.

A22. The TPV composition of any of A1-A18, wherein the ethylene based copolymer has an ethylene content of from 55 wt % to 65 wt % based on a total weight of the ethylene based copolymer.

A23. The TPV composition of any of A1-A22, wherein the ethylene based copolymer has a Mw of from 400,000 g/mol to 1,000,000 g/mol.

A24. The TPV composition of any of A1-A22, wherein the ethylene based copolymer has a Mw of from 400,000 g/mol to 700,000 g/mol.

A25. The TPV composition of any of A1-A24, wherein the ethylene based copolymer comprises a diene monomer selected from the group consisting of 5-ethylidene-2-norbornene (ENB), 5-vinyl-2-norbornene (VNB), and combinations thereof.

A26. The TPV composition of any of A1-A25, wherein a diene content of the ethylene based copolymer is from 3 wt % to 15 wt % based on the total weight of the ethylene based copolymer.

A27. The TPV composition of any of A1-A25, wherein a diene content of the ethylene based copolymer is from 4 wt % to 12 wt % based on the total weight of the ethylene based copolymer.

A28. The TPV composition of any of A1-A27, wherein the ethylene based copolymer is produced by a slurry polymerization process using a Zeigler-Natta catalyst or a metallocene catalyst.

A29. The TPV composition of any of A1-A28, wherein the ethylene based copolymer is produced by a solution or gas phase polymerization process using a Zeigler-Natta catalyst or a metallocene catalyst.

A30. The TPV composition of any of A1-A29, wherein the thermoplastic polyolefin has: a melt mass flow rate (ASTM D1238; 230° C.; 2.16 kg) of from 0.1 g/10 min to 50 g/10 min; and a Mw of from 100,000 g/mol to 1,000,000 g/mol.

A31. The TPV composition of any of A1-A30, wherein the thermoplastic polyolefin has: a melt mass flow rate (ASTM D1238; 230° C.; 2.16 kg) of from 0.5 g/10 min to 5 g/10 min; and a Mw of from 400,000 g/mol to 800,000 g/mol.

A32. The TPV composition of any of A1-A31, wherein the composition has a hardness of from 20 Shore A to 60 Shore D.

A33. The TPV composition of any of A1-A31, wherein the composition has a hardness of from 40 Shore A to 80 Shore A.

A34. The TPV composition of any of A1-A33, wherein the composition has a G' value (@ 90° C., 0.6 rad/s, and 1% strain) of from 600 kPa to 2000 kPa.

A35. The TPV composition of any of A1-A33, wherein the composition has a G' value (@ 90° C., 0.6 rad/s, and 1% strain) of from 700 kPa to 1500 kPa.

A36. The TPV composition of any of A1-A35, wherein the composition has a capillary viscosity of 120 Pa s or less, as measured at 204° C. and a shear rate of 1,200 $s^{-1}$.

A37. The TPV composition of any of A1-A36, wherein the thermoplastic polyolefin has a $g'_{vis}$ of from 0.9 or more.

A38. The TPV composition of any of A1-A37, wherein 10 wt % to 33 wt % of the total amount of the one or more of an oil or a plasticizer is added before the curative and 67 wt % to 90 wt % of the total amount of the one or more of an oil or a plasticizer is added after the curative.

A39. The TPV composition of any of A1-A37, wherein 20 wt % to 30 wt % of the total amount of the one or more of an oil or a plasticizer is added before the curative and 70 wt % to 80 wt % by of the total amount of the one or more of an oil or a plasticizer is added after the curative.

A40. The TPV composition of any of A1-A39, wherein the ethylene based copolymer of the TPV composition has a Δδ of from 30 to 80 degrees from small amplitude oscillatory shear (SAOS) where Δδ=δ (0.1 rad/s)-δ (128 rad/s), or a large amplitude oscillatory shear (LAOS) branching index of less than 3.

A41. The TPV composition of any of A1-A40, wherein the TPV composition has an extrusion surface roughness that is from 50 μin to 150 μin.

A42. The TPV composition of any of A1-A40, wherein the TPV composition has an extrusion surface roughness that is from 58 μin to 120 μin.

A43. The TPV composition of any of A1-A42, wherein the TPV composition has a tension set of less than 16%.

A44. The TPV composition of any of A1-A42, wherein the TPV composition has a tension set of less than 14%.

A45. The TPV composition of any of A1-A44, wherein the TPV composition has an extrusion surface roughness that is from 50 μin to 150 μin and tension set of less than 16%.

A46. The TPV composition of any of A1-A44, wherein the TPV composition has an extrusion surface roughness that is from 58 μin to 120 μin and tension set of less than 14%.

A47. The TPV composition of any of A1-A46, wherein the ethylene based copolymer has a dry Mooney Viscosity ($ML_{1+4}$ @ 125° C.) of 250 MU or greater.

A48. The TPV composition of any of A1-A47, wherein the ethylene based copolymer has a dry Mooney Viscosity ($ML_{1+4}$ @; 125° C.) of 350 MU or more.

A49. The TPV composition of any of A1-A48, wherein the ethylene based copolymer has a LCB index (@ 125° C.) of 2.5 or lower.

A50. The TPV composition of any of A1-A48, wherein the ethylene based copolymer has a LCB index (@ 125° C.) of 2.0 or lower.

A51. The TPV composition of any of A1-A50, wherein the ethylene based copolymer has a Δδ of 32° or greater, where Δδ=δ (0.1 rad/s)-δ(128 rad/s).

A52. The TPV composition of any of A1-A50, wherein the ethylene based copolymer has a Δδ of 35° or greater, where Δδ=δ (0.1 rad/s)-δ(128 rad/s).

A53. The TPV composition of any of A1-A52, wherein the ethylene based copolymer is oil extended with an oil having 50 phr to 200 phr based on 100 phr of the ethylene based copolymer.

A54. The TPV composition of any of A1-A52, wherein the ethylene based copolymer is oil extended with an oil having 75 phr to 120 phr based on 100 phr of the ethylene based copolymer.

A55. The TPV composition of any of A1-A54, wherein the ethylene based copolymer content is from 10 wt % to 90 wt % based on a total weight of TPV composition.

A56. The TPV composition of any of A1-A55, wherein the TPV composition has a stress relaxation slope of −1 to −5 (1/min) as measured by an Elastocon stress relaxation instrument.

A57. The TPV composition of any of A1-A56, wherein the TPV composition has a tan δ value (@ 215° C. 5.0 rad/s, and 100% strain) of from 0.25 to 1.0.

A58. The TPV composition of any of A1-A57, wherein the TPV composition has a stress relaxation slope of −2 to −4.5 (1/min) as measured by an Elastocon stress relaxation instrument.

B1. A method of making a TPV composition, comprising: introducing an ethylene based copolymer to an extrusion reactor; introducing a thermoplastic polyolefin to the extrusion reactor; introducing a filler, an additive, or a combination of filler and additive to the extrusion reactor; introducing a first amount of one or more of an oil or a plasticizer to the extrusion reactor before a curative; introducing the curative to the extrusion reactor; introducing a second amount of one or more of an oil or a plasticizer to the extrusion reactor after the curative, wherein 3 wt % to 37 wt % of a total amount of the one or more of an oil or a plasticizer is added to the extrusion reactor before the curative and 63 wt % to 97 wt % of the total amount of the one or more of an oil or a plasticizer is added to the extrusion reactor after the curative; and dynamically vulcanizing the ethylene based copolymer with the curative in the presence of the thermoplastic polyolefin to form a TPV composition.

B2. The method of B1, further comprising introducing a filler, an additive, or a combination of filler and additive to the extrusion reactor.

B3. The method of B1 or B2, wherein the extrusion reactor is a twin screw extruder.

B4. The method of any of B59-B62, wherein a weight ratio of the second amount of one or more of an oil or a plasticizer to the first amount of one or more of an oil or plasticizer is from 2:1 to 10:1.

B5. The method of any of B59-B62, wherein a ratio of the second amount of one or more of an oil or a plasticizer to the first amount of one or more of an oil or a plasticizer is from 2:1 to 7:1.

B6. The method of any of B59-B63, wherein 10 wt % to 33 wt % of the total amount of the one or more of an oil or a plasticizer is added before the curative and 67 wt % to 90 wt % of the total amount of the one or more of an oil or a plasticizer is added after the curative.

B7. The method of any of B59-B63, wherein 20 wt % to 30 wt % of the total amount of the one or more of an oil or a plasticizer is added before the curative and 70 wt % to 80 wt % by of the total amount of the one or more of an oil or a plasticizer is added after the curative.

B8. The method of any of B1-B7, wherein the TPV composition is the TPV composition of any of A1-A58.

C1. A method of forming an article, comprising: extruding, injection molding, blow molding, compression molding, thermoforming, or 3-D printing the TPV composition of any of A1-A58; and forming an article.

C2. The method of C1, wherein the article is extruded tape, a weather seal, a door panel, a gasket, a pipe seal, a hose, a belt, or a boot.

D1. An article, comprising, the TPV composition of any of A1-A58.

D2. The article of D1, wherein the article is extruded tape, a weather seal, a door panel, a gasket, a pipe seal, a hose, a belt, or a boot.

E1. An article, comprising the TPV composition made with the method of any of B1-B8 and C1.

Experimental

Sample Preparation Using a Twin Screw Extruder (TSE)

The following description explains the process employed in the following samples unless otherwise specified. A co-rotating, fully intermeshing type twin screw extruder, supplied by Coperion Corporation, Ramsey N.J., was used following a method similar to that described in U.S. Pat. No. 4,594,391 and US 2011/0028637 (excepting those altered conditions identified here). EPDM was fed into the feed throat of a ZSK 53 extruder of L/D (length of extruder over its diameter) of about 44. The thermoplastic resin (polypropylene) was also fed into the feed throat along with other reaction rate control agents such as zinc oxide and stannous chloride. Fillers, such as clay and black MB, were also added into the extruder feed throat. Process oil was injected into the extruder at two different locations along the extruder. The curative was injected into the extruder after the rubber, thermoplastics, oil, and fillers commenced blending at an L/D of about 18.7, but after the introduction of first process oil (pre-cure oil) at an L/D of about 4.5. In some examples, the curative was injected with the process oil, which oil may or may not have been the same as the other oil introduced to the extruder or the oil the rubber was extended with. The second process oil (post-cure oil) was injected into the extruder after the curative injection at an L/D of about 34.5. Rubber crosslinking reactions were initiated and controlled by balancing a combination of viscous heat generation due to application of shear, barrel temperature set point, use of catalysts, and residence time.

The extrusion was carried out at throughput rate of 90 kg/hr and the extrusion mixing was carried out at 320 revolutions per minute (RPM), unless specified. A barrel metal temperature profile in ° C., starting from the second barrel section of the extruder down towards the die to barrel section 12 of 160/160/160/160/165/165/165/165/180/180/180/180° C. (wherein the last value is for the die) was used. The barrels sections refer to the different barrels of the extruder with the barrel closest to the hopper or the feed throat labeled as barrel section 1. Low molecular weight contaminants, reaction by-products, residual moisture and the like were removed by venting through one or more vent ports, typically under vacuum, as needed. The final product was filtered using a melt gear pump and a filter screen of desired mesh size. A screw design with several mixing sections including a combination of forward convey, neutral, left handed kneading blocks and left handed convey elements to mix the process oil, cure agents and provide sufficient residence time and shear for completing the cure reaction, without slip or surging in the extruder, were used.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80 µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, αPS=0.67 and KPS=0.000175 while α and K are for other materials as calculated and published in literature (Sun, T. et al., *Macromolecules*, 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0 0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated as $$M = K_{PS} M^{\alpha_{PS}+1}/[\eta]$$

where $\alpha_{PS}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'_{vis} = \frac{[\eta]_{avg}}{KM_v^\alpha}$$

where $M_V$ is the viscosity-average molecular weight based on molecular weights determined by LS analysis and the K and α are for the reference linear polymer, which are, for purposes of the present disclosure, α=0.700 and K=0.0003931 for ethylene, propylene, diene monomer copolymers, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

In some embodiments, the high viscosity, long-chain branched polyolefins employed in the present disclosure are prepared by converting solid, high molecular weight, linear, propylene polymer material with irradiating energy as disclosed in U.S. Pat. No. 5,414,027, which is incorporated herein by reference for purpose of U.S. patent practice. Other techniques include treatment of linear polymer with heat and peroxide as disclosed in U.S. Pat. No. 5,047,485, which is incorporated herein by reference for purpose of U.S. patent practice. Other useful high viscosity, long-chain branched polyolefins are disclosed in U.S. Pat. Nos. 4,916,198, 5,047,446, 5,570,595, and European Publication Nos. 0 190 889, 0 384 431, 0 351 866, and 0 634 441, which are also incorporated herein by reference for purpose of U.S. patent practice.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively.

$$w2 = f * SCB/1000TC$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk CH3/1000 } TC$$

$$\text{bulk } SCB/1000TC = CH3/1000TC - \text{bulk } \frac{CH3end}{1000\,TC}$$

and bulk SCB/1000TC is converted to bulk w2 in the same manner as described above.

Phase Angle and Δδ from Small Amplitude Oscillatory Shear (SAOS)

The rheological measurements properties of the EPDMs were measured by small amplitude oscillatory shear (SAOS) measurements. The SAOS measurements were completed on an Alpha Technologies ATD1000 using 25 mm parallel plates with a gap of 2.5 mm. The EPDM samples were prepared by drying in a vacuum oven at a temperature of 60° C. for 8 h. A 5 gram quantity material was placed between two 0.001" polyester sheets (Alpha part #F0141) to prevent the samples from sticking to the parallel plate fixture. The material was allowed to melt for 30 s prior to closing the fixture. The first shear measurement was made after 4.5 min of clamping inside the fixture. The dynamic properties of the polymer were characterized in the frequency range from 0.1 rad/s to 256 rad/s (logarithmic scaling). The applied stresses and deformations are within the limits of linear viscoelasticity. The oscillatory measurements were used to measure phase angle δ as a function of frequency. The Δδ parameter is defined as the difference between the phase angle (δ) at frequencies of 0.1 and 128 rad/s, as derived from a frequency sweep at 125° C.

The non-linear rheological measurements properties of the EPDMs were measured by large amplitude oscillatory shear (LAOS) measurements. The LAOS measurements were completed on an Alpha Technologies ATD1000 using 25 mm parallel plates with a gap of 2.5 mm. The EPDM samples were prepared by drying in a vacuum oven at a temperature of 60° C. for 8 h. A 5 gram quantity material was placed between two 0.001" polyester sheets (Alpha part #F0141) to prevent the samples from sticking to the parallel plate fixture. The material was allowed to melt for 30 s prior to closing the fixture. The first shear measurement was made after 4.5 min of clamping inside the fixture. The large amplitude oscillatory properties of the polymer was characterized using a frequency of 0.63 rad/s and strain amplitude of 1000%. The storage modulus associated with different modes or harmonic can be extracted by using a Fourier transformation of the stress-strain curves. See, e.g., Hyun et al., "A review of nonlinear oscillatory shear tests: Analysis and application of large amplitude oscillatory shear (LAOS), Progress in Polymer Science, Vol. 36, Issue 12, pp. 1697-1753, 2011. The corresponding storage modulus associated with each harmonic can be defined as $G'_1$, $G'_2$, $G'_3$, etc. The LAOS measurements were used to measure first, third and fifth harmonics. The LAOS branching index (BI) is defined as [T. Rauschumann, "Linear and Non Linear Rheological Measurements on Rubber Polymers and Compounds", presentation given at Innovations in Rubber Design Conference (organized by Rubber in Engineering Group), Hamilton Pl, London W1J 7BQ, Dec. 6-7, 2016]:

$$BI = \frac{G_1}{G_5} - E_3$$

$$E_3 = \frac{5}{4} + \frac{1}{4}\left(\frac{G'_3}{G'_5}\right)^2 - \frac{1}{2}\left(\frac{G'_3}{G'_5}\right)$$

where $G_1$ corresponds to $1^{st}$ harmonic storage modulus, $G_3$ the $2^{nd}$ harmonic storage modulus, and $G'_5$ the $3^{rd}$ harmonic storage modulus.

Shore A Hardness was measured using a Zwick automated durometer according to ASTM D2240 (15 sec. delay). Shore D Hardness was measured using a Zwick automated durometer according to ASTM D2240.

Tensile strength and elongation at break were measured on injection molded plaques according to ASTM D412 at 23° C. (unless otherwise specified) at 50 mm per minute by using an Instron testing machine.

The tension set was measured at 70° C. and for 22 h by applying a 50% Strain. The samples are taken out under tension and allowed to cool for 2 h. The measurements are performed 30 min after releasing from tension.

The compression set was measured at 70° C. and for 94 h by applying a 50% deflection on a 3 layer plied stack. The samples are taken out under compression and allowed to cool for 3 h under compression. The measurements are performed within 5 s after releasing from compression.

The weight gain % was measured according to ASTM D471 for 24 h and at 121° C. using IRM903 oil.

Extrusion surface roughness ("ESR") in micro inches was measured as follows: approximately 1 kg (2 lbs.) of the TPV to be tested was fed into a 1" or 1.5" diameter extruder (Davis-Standard) equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed Zone); Zone 2=190° C. (feed Zone); Zone 3—200° C. (feed Zone); Zone 4—205° C. (die Zone). When the zone temperatures were reached, the screw was activated. Screw speed was set to maintain an output of approximately 50 grams per minute during material purging. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner and ESR was measured on the samples using a model EMD-04000 W5 Surfanalyzer System 4000 including a universal probe 200 mg stylus force and a Surfanalyzer proper tip type EPT-01049 (0.025 mm (0.0001") stylus radius).

Total surface spots was measured as follows: approximately 1 kg (2 lbs.) of the TPV to be tested was fed into a 1" or 1.5" diameter extruder. The extruder was fitted with a strip die 25.4 mm (1") wide×0.5 mm (0.019") thick×7 to 10 mm (0.25 to 0.40") length. Temperature profiles of the extruder were as follows: Zone 1=180° C. (feed Zone); Zone 2=190° C. (feed Zone); Zone 3—200° C. (feed Zone), Zone 4—205° C. (die Zone). Three representative samples were collected in this manner and total surface spots was measured on the samples by visually examining and counting surface spots using a 100 watt illumination with 1.75 power magnification. Average number of total surface spots greater than 0.8 mm² was determined according to the TAPPI chart.

Rheological properties of the TPV compositions were measured by small angle oscillatory shear measurements. The SAOS measurements were completed on an Alpha Technologies ATD 1000 using serrated 25 mm parallel plates with a gap of 2.5 mm. The TPV samples were prepared for the test by placing the sample in a vacuum oven at a temperature from about 60° C. to about 70° C. for a time of from about 8 to about 12 hours prior to analysis. 5 gram quantities of the material were then placed between two 0.001" polyester sheets (Alpha part #FO141) to prevent the samples from sticking to the parallel plate fixture. The material was allowed to melt for 30 seconds prior to closing the fixture. The first shear measurement was made after 4.5 minutes of clamping inside the fixture. Bulk Modulus components and shear viscosity components from each run were calculated by the machine software (Workbench v 5.70 published by Alpha Technologies). The G' was measured at 1% strain, 0.6 rad/s, 90° C. Tan Delta was measured at 1% strain, 0.6 rad/s, 90° C.

Stress relaxation or estimate of force retention at 70° C. (73° F.) during the first 30 minutes are measured on injection molded buttons loaded at 2.54 mm per minute. The percent retention factor is applied to the initial sealing force to determine the relaxation time from t=0 to t=30 minutes. The amount of force decay from t=30 minutes to a desired time is generally measured in accordance with the compression stress-relaxation ISO 3384(A). Here, a 2 mm thick sheet is plied to a thickness of 6 mm to form a button that is compressed by 35%, and the decrease in the initial compression force measured over time.

Test results are presented according to this relationship:

$$Rt(\%) = \frac{Ft}{F0} \times 100$$

Where: Rt (%)=compression force retention at time t (min), Ft=force at time t (min), F0=force at time t=0 min. The stress relaxation slope is determined from the slope of the line plot of Ft/Fo as a function of time in minutes.

Die pressure was measured using TA instruments.

Complex viscosity ($\eta^*$, @ 215° C.) was measured using an Alpha instruments APA. Complex viscosity was measured on a 2 mm thick sheet and is reported at 215° C. measured using a frequency of 0.1 Hz.

Capillary viscosity was measured using a capillary rheometer at a temperature of 204° C. Capillary viscosity reported is measured at a shear rate of 1200 1/s.

In order to demonstrate the practice of the present disclosure, the following examples have been prepared and tested. The examples should not, however, be viewed as limiting the scope of the present disclosure.

EXAMPLES

Preparation of the examples and comparatives are provided above. All comparatives and examples were made with the twin screw extruder (TSE) and were tested on injection molded plaques.

$SnCl_2$-45 wt % MB is an anhydrous stannous chloride polypropylene masterbatch. The $SnCl_2$ MB contains 45 wt % stannous chloride and 55 wt % of polypropylene having an MFR of 0.8 g/10 min (ASTM D1238; 230° C. and 2.16 kg weight).

Zinc oxide (ZnO) is Kadox 911.

The phenolic curative (a phenolic resin in oil, 30 wt % phenolic resin and 70 wt % oil) is a resole-type resin obtained from Schenectady International.

Fillers were Icecap™ K Clay (available from Burgess) and Ampacet 49974 black MB (available from Ampacet Corp.) referred to below as black MB.

The paraffinic oil was Paramount 6001R (Chevron Phillips).

Tables 4 and 5 set forth the ingredients and amounts (parts per hundred rubber, phr) employed used in each sample and the results of physical testing that was performed on each sample. Those samples that correspond with the present disclosure are designated with "Ex.," and those that are comparative are designated with the letter "C."

The elastomeric (rubber) terpolymer was an EPDM rubber (Keltan™ 4969Q and Keltan™ 5469Q), and the molecular properties of each EPDM is provided above. One of the used polypropylenes was obtained under the trade name PP5341™ (ExxonMobil), and the molecular properties of the polypropylene are described above. EXP-PP is a high melt strength polypropylene described in US20180016414 and US20180051160.

TABLE 4

| Formulation (phr) | C1 | C2 | C3 | C4 | Ex. 1 | Ex. 2 | Ex. 3 | C5 | Ex. 4 | C6 | Ex. 5 |
|---|---|---|---|---|---|---|---|---|---|---|---|
| Keltan 5469Q | 200 | 200 | 200 | 200 | 200 | 200 | 200 | 200 | 200 | — | — |
| Keltan 4969Q | — | — | — | — | — | — | — | — | — | 200 | 200 |
| PP5341 | 26.97 | 26.97 | 26.97 | 26.97 | 26.97 | 26.97 | 26.97 | — | — | — | — |
| EXP-PP | — | — | — | — | — | — | — | 26.97 | 26.97 | 26.51 | 26.51 |
| Black MB | 23.96 | 23.96 | 23.96 | 23.96 | 23.96 | 23.96 | 23.96 | 23.96 | 23.96 | 23.96 | 23.96 |
| Clay | 42 | 42 | 42 | 42 | 42 | 42 | 42 | 42 | 42 | 42 | 42 |
| ZnO | 1.5 | 1.5 | 1.5 | 1.5 | 1.5 | 1.5 | 1.5 | 1.5 | 1.5 | 1.5 | 1.5 |
| $SnCl_2$-45% MB | 1.67 | 1.67 | 1.67 | 1.67 | 1.67 | 1.67 | 1.67 | 1.67 | 1.67 | 2.51 | 2.51 |
| Phenolic resin in oil | 7.56 | 7.56 | 7.56 | 7.56 | 7.56 | 7.56 | 7.56 | 7.56 | 7.56 | 11.34 | 11.34 |
| Paramount 6001R (first oil injection, L/D = 4.5) | 0 | 25.60 | 38.10 | 13.10 | 13.10 | 13.10 | 13.10 | 13.10 | 13.10 | 13.10 | 13.10 |
| Paramount 6001R (second oil injection, L/D = 34.5) | 30.72 | 30.72 | 30.72 | 18.22 | 30.72 | 55.72 | 80.72 | 30.72 | 55.72 | 28.10 | 53.07 |
| Total phr (all ingredients) | 334.4 | 360.0 | 372.5 | 335.0 | 347.5 | 372.5 | 397.5 | 347.5 | 372.5 | 349.0 | 374.0 |
| Total process oil added in extruder (phr) | 30.72 | 56.23 | 68.82 | 31.32 | 43.82 | 68.82 | 93.82 | 43.82 | 68.82 | 41.20 | 66.17 |
| wt % Process oil added in the extruder post cure zone | 100 | 54.6 | 44.6 | 58.2 | 70.1 | 81.0 | 86.0 | 70.0 | 81.0 | 68.2 | 80.0 |
| Weight ratio of process oil added post- and pre- cure zone in the extruder | N/A | 1.20 | 0.81 | 1.39 | 4.25 | 4.25 | 6.16 | 2.34 | 4.25 | 2.15 | 4.05 |
| Properties | | | | | | | | | | | |
| Hardness, shore A | 61 | 62 | 59 | 66 | 65 | 63 | 58 | 62 | 59 | 64 | 61 |
| Tensile strength, MPa | 5.8 | 5.8 | 5.3 | 6.7 | 6.3 | 5.7 | 5.0 | 5.1 | 5.0 | 5.4 | 4.6 |
| Elongation at break, % | 417 | 417 | 422 | 482 | 451 | 420 | 377 | 350 | 288 | 308 | 283 |
| Tension set, % | 13.3 | 13.2 | 12.5 | 14.0 | 13.5 | 12.5 | 11.5 | 15.2 | 13.0 | 14.2 | 10.2 |
| Compression set % | — | — | — | — | — | — | — | 73 | 66 | 64 | — |
| Weight gain, % (24 h @ 121° C.) | 69 | 64 | 64 | 74 | 65 | 62 | 60 | 69 | 65 | 55 | 56 |
| ESR, µin (Ra) | 63 | 115 | 281 | 69 | 71 | 77 | 116 | 88 | 83 | 88 | 61 |
| Die pressure (psi) | 130 | 140 | 105 | 125 | 127 | 103 | 92 | 295 | 140 | 290 | 50 |
| G' (@ 90° C.), kPa (Strain 1%) | 1321 | 1087 | 954 | 1187 | 1452 | 1225 | 872 | — | — | — | — |
| tanδ (@ 90° C.) (Strain 1%) | 0.034 | 0.037 | 0.023 | 0.06 | 0.05 | 0.038 | 0.032 | — | — | — | — |
| Complex viscosity, η* (@ 215° C.), 0.1 Hz, Pa.s | 15352 | 14017 | 12210 | 31742 | 25752 | 13149 | 16943 | — | — | — | — |
| Capillary viscosity (Pa.s) at 204° C., 1200 1/s shear rate | 95 | 89 | 85 | 104 | 95 | 91 | 75 | 90 | 78 | 86 | 82.5 |
| Total surface spots | — | — | — | — | — | — | — | 26 | 17 | — | — |

"Ra" refers to mean surface roughness

TABLE 5

| Formulation (phr) | C7 | C8 | Ex. 6 | Ex. 7 |
|---|---|---|---|---|
| EPDM 1 | 100 | 100 | 100 | 100 |
| PP5341 | 26.97 | — | 26.97 | — |
| EXP-PP | — | 26.97 | — | 26.97 |
| Black MB | 23.96 | 23.96 | 23.96 | 73.96 |
| Clay | 42 | 42 | 42 | 42 |
| ZnO | 1.5 | 1.5 | 1.5 | 1.5 |
| SnCl$_2$-45% MB | 1.67 | 1.67 | 1.67 | 1.67 |
| Phenolic resin in oil | 7.56 | 7.56 | 7.56 | 7.56 |
| Paramount 6001R (first oil injection, L/D = 4.5) | 62.52 | 62.52 | 51.6 | 51.6 |
| Paramount 6001R (second oil injection, L/D = 34.5) | 81.30 | 81.30 | 92.2 | 92.2 |
| Total phr (all ingredients) | 347.48 | 347.48 | 347.48 | 347.48 |
| Total process oil added in extruder (phr) | 143.82 | 143.82 | 143.82 | 143.82 |
| wt % Process oil added in the extruder post cure zone | 56.5 | 56.5 | 64.1 | 64.1 |
| Weigh ratio of process oil added post- and pre- cure zone in the extruder | 1.30 | 1.30 | 1.80 | 1.80 |
| Properties | | | | |
| Hardness, shore A | 60 | 59 | 59.5 | 60 |
| Tensile strength, MPa | 4.2 | 3.5 | 4.1 | 3.6 |
| Elongation at break, % | 760 | 210 | 280 | 260 |
| Tension set, % | 17.2 | 16.2 | 20.5 | 20.2 |
| % improvement in tension set over commercial Santoprene 121-58W175 | 18.5 | 23.5 | 20.1 | 22.0 |
| Weight gain, % (24 h @ 121° C.) | 96 | 95 | 68 | 65 |
| ESR, μin (Ra) | 258 | 414 | 65 | 60 |
| G' (@ 90° C.), kPa (Strain 1%) | 778 | 737 | 821 | 872 |
| Capillary viscosity (Pa · s) at 204° C. 1200 1/s shear rate | 95 | 89 | 64 | 58 |

"Ra" refers to mean surface roughness

As shown in Tables 4 and 5, the Example TPV compositions generally show a lower tension set and a lower weight gain (an indication of higher cure state and improved oil resistance) relative to the Comparative TPV compositions. The Example TPV compositions have a lower tension set (improved elasticity and resilience) at higher or similar hardness relative to the Comparative TPV compositions. The Example TPV compositions have better surface roughness and viscosity with the values for tension set being within experimental variation of the comparative examples.

Typically, the addition of oil has a negative impact on the viscosity of TPV compositions. However, the inventors have found that the location and amount of oil added plays a role in determining the elasticity, viscosity, and surface roughness of the TPV compositions. The data shows that addition of more post cure oil produces TPV compositions having better elasticity, improved processability and improved surface roughness.

The Example TPV compositions also show improved properties for ESR, Die Pressure, G', and tan δ, with improved characteristics measured as a lower ESR, lower Die Pressure, higher G', and lower tan δ. As such, the Example TPV compositions show a significantly improved balance of properties.

The inventors also found that elasticity improvements can be observed when using post-cure oil injections after curing locks in the morphology. In addition, when the amount of pre-cure oil is increased, the elasticity properties worsen. When excess pre-cure oil is added, there is likely an increased slippage between the extruder screw and the barrel. This likely results in an inefficient mixing of the PP and EPDM, and the poor mixing likely results in a lack of morphology development that can affect the elasticity and surface roughness of the resultant TPV composition.

The present disclosure provides TPV compositions that include an ethylene based copolymer (e.g., an ethylene-propylene-diene terpolymer) and a thermoplastic polyolefin (such as a polypropylene). Embodiments of the present disclosure can provide improved TPV compositions with excellent elastic recovery and fabricability/processability to be particularly suitable for shaped articles and as shaped components as part of composite structures. The TPV compositions disclosed herein can have an excellent balance of flow and elastic properties relative to conventional TPV compositions.

The inventors have discovered that a TPV composition with superior elastic properties and improved flow can be obtained by tuning a ratio of a post-cure oil to a pre-cure oil added. In addition, the inventors have found that incorporation of excess oil to reduce viscosity negatively impacts elasticity and surface extrusion properties. However, it was found that if the excess oil is added post-cure, the TPV melt viscosity can be significantly reduced while enhancing elasticity. Increasing the post-cure oil content was found to improve elastic recovery after compression and tension at short recovery times under elevated temperature conditions. This approach can be adopted when formulating TPV compositions.

All documents described herein are incorporated by reference herein, including any priority documents and/or testing procedures to the extent they are not inconsistent with this text. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of," "selected from the group of consisting of" or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A thermoplastic vulcanizate (TPV) composition, comprising:
an ethylene based copolymer, wherein the ethylene based copolymer has an Mw of from 400,000 g/mol to 3,000,000 g/mol, a Mw/Mn of 10 or less, a $\Delta\delta$ of from 30 to 80 degrees from small amplitude oscillatory shear (SAOS) where $\Delta\delta=\delta(0.1\ rad/s)-\delta(128\ rad/s)$, and a $g'_{vis}$ of 0.7 or more;
a thermoplastic polyolefin; and
one or more of an oil or a plasticizer, wherein an amount of the one or more of an oil or a plasticizer in the TPV composition is from 10 parts by weight to 200 parts by weight per 100 parts by weight of the ethylene based copolymer.

2. The TPV composition of claim 1, wherein the thermoplastic polyolefin has a $g'_{vis}$ of 0.9 or more.

3. The TPV composition of claim 1, wherein the thermoplastic polyolefin has a $g'_{vis}$ of less than 0.9.

4. The TPV composition of claim 1, wherein the ethylene based copolymer is an ethylene-propylene-diene terpolymer.

5. The TPV composition of claim 1, wherein the oil is a mineral oil, a synthetic oil, an ester plasticizer, or a combination thereof.

6. The TPV composition of claim 5, wherein the mineral oil is a Group II oil, a total amount of aromatic compounds and polar compounds in the oil is less than 4.5 wt % as measured according to ASTM 2007, and a viscosity of the oil is at least 80 cSt at 40° C.

7. The TPV composition of claim 1, further comprising a compatibilizer, a filler, a nucleating agent, or a combination thereof.

8. The TPV composition of claim 1, further comprising a curative.

9. The TPV composition of claim 1, wherein the ethylene based copolymer has an ethylene content of from 50 wt % to 70 wt % based on a total weight of the ethylene based copolymer.

10. The TPV composition of claim 1, wherein the thermoplastic polyolefin has:
a melt mass flow rate (ASTM D1238; 230° C.; 2.16 kg) of from 0.1 g/10 min to 50 g/10 min; and
a Mw of from 100,000 g/mol to 1,000,000 g/mol.

11. The TPV composition of claim 1, wherein the composition has a hardness of from 20 Shore A to 60 Shore D.

12. The TPV composition of claim 1, wherein the composition has a G' value (@ 90° C., 0.6 rad/s, and 1% strain) of from 600 kPa to 2000 kPa.

13. The TPV composition of claim 1, wherein the composition has a capillary viscosity of 120 Pa s or less, as measured at 204° C. and a shear rate of 1,200 s$^{-1}$.

14. The TPV composition of claim 1, wherein the ethylene based copolymer of the TPV composition has a large amplitude oscillatory shear (LAOS) branching index of less than 3.

15. The TPV composition of claim 1, wherein the TPV composition has a tension set of less than 16%.

16. The TPV composition of claim 1, wherein the ethylene based copolymer has a dry Mooney Viscosity ($ML_{1+4}$@ 125° C.) of 250 MU or greater.

17. The TPV composition of claim 1, wherein the ethylene based copolymer has a LCB index (@ 125° C.) of 2.5 or lower.

18. The TPV composition of claim 1, wherein the ethylene based copolymer has a $\Delta\delta$ of 32 degrees or greater, where $\Delta\delta=\delta(0.1\ rad/s)-\delta(128\ rad/s)$.

19. The TPV composition of claim 1, wherein the ethylene based copolymer is oil extended with an oil having 50 phr to 200 phr based on 100 phr of the ethylene based copolymer.

20. The TPV composition of claim 1, wherein the ethylene based copolymer content is from 10 wt % to 90 wt % based on a total weight of TPV composition.

21. The TPV composition of claim 1, wherein the TPV composition has a stress relaxation slope of −1 to −5 (1/min) as measured by an Elastocon stress relaxation instrument.

22. The TPV composition of claim 1, wherein the TPV composition has a tan δ value (@ 215° C., 5.0 rad/s, and 100% strain) of from 0.25 to 1.0.

23. A method of making a TPV composition, comprising:
introducing an ethylene based copolymer having a $\Delta\delta$ of from 30 to 80 degrees from small amplitude oscillatory shear (SAOS) where $\Delta\delta=\delta(0.1\ rad/s)-\delta(128\ rad/s)$ to an extrusion reactor;
introducing a thermoplastic polyolefin to the extrusion reactor;
introducing a filler, an additive, or a combination of filler and additive to the extrusion reactor;
introducing a first amount of one or more of an oil or a plasticizer to the extrusion reactor before a curative;
introducing the curative to the extrusion reactor;
introducing a second amount of one or more of an oil or a plasticizer to the extrusion reactor after the curative, wherein 3 wt % to 37 wt % of a total amount of the one or more of an oil or a plasticizer is added to the extrusion reactor before the curative and 63 wt % to 97 wt % of the total amount of the one or more of an oil or a plasticizer is added to the extrusion reactor after the curative; and
dynamically vulcanizing the ethylene based copolymer with the curative in the presence of the thermoplastic polyolefin to form a TPV composition.

24. The method of claim 23, further comprising introducing a filler, an additive, or a combination of filler and additive to the extrusion reactor.

25. The method of claim 23, wherein a weight ratio of the second amount of one or more of an oil or a plasticizer to the first amount of one or more of an oil or plasticizer is from 2:1 to 10:1.

26. An article formed from the TPV composition of claim 1, wherein the article has an extrusion surface roughness that is from 50 μin to 120 μin.

* * * * *